US009298262B2

(12) United States Patent
Yairi et al.

(10) Patent No.: US 9,298,262 B2
(45) Date of Patent: Mar. 29, 2016

(54) DYNAMIC TACTILE INTERFACE

(71) Applicant: Tactus Technology, Inc., Fremont, CA (US)

(72) Inventors: Micah Yairi, Fremont, CA (US); Roman Rak, Fremont, CA (US); Jonathon Jenkins, Fremont, CA (US); Craig Ciesla, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 8 days.

(21) Appl. No.: 14/480,331

(22) Filed: Sep. 8, 2014

(65) Prior Publication Data

US 2015/0077367 A1 Mar. 19, 2015

Related U.S. Application Data

(60) Provisional application No. 61/874,902, filed on Sep. 6, 2013.

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01); *G06F 2203/04105* (2013.01); *G06F 2203/04809* (2013.01)

(58) Field of Classification Search
None
See application file for complete search history.

(56) References Cited

U.S. PATENT DOCUMENTS 3,034,628 A 5/1962 Wadey
3,659,354 A 5/1972 Sutherland
(Continued)

FOREIGN PATENT DOCUMENTS

CN 1260525 A 7/2000
CN 1530818 A 9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Jason Olson
*Assistant Examiner* — Krishna Neupane
(74) *Attorney, Agent, or Firm* — Jeffrey Schox

(57) ABSTRACT

A dynamic tactile interface including a substrate including an attachment surface, a cavity, and a fluid channel fluidly coupled to the cavity; a pedestal arranged within the cavity, pivotable within the cavity, and including a mating surface and an exterior surface; a tactile layer including a peripheral region coupled to the attachment surface, a deformable region adjacent the peripheral region and arranged over the pedestal, and a tactile surface opposite the substrate; and a displacement device displacing fluid to transition the deformable region from a retracted setting into an expanded setting, the pedestal pivotable within the cavity between a first position and a second position in the retracted setting, the deformable region flush with the peripheral region in the first position and the pedestal partially elevated out of the cavity and the deformable region defining a second formation tactilely distinguishable from the peripheral region in the expanded setting.

20 Claims, 11 Drawing Sheets

(56) References Cited

U.S. PATENT DOCUMENTS

| | | |
|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A * | 3/1996 | Garner ............ G09B 21/003 434/113 |
| 5,496,175 A | 3/1996 | Gamer |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |

(56) References Cited

U.S. PATENT DOCUMENTS

| | | |
|---|---|---|
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |

(56) References Cited

U.S. PATENT DOCUMENTS

| | | |
|---|---|---|
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1* | 1/2009 | Ullrich .................... G06F 3/016 345/173 |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1* | 7/2009 | Ciesla .................. G06F 3/04886 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |

(56) References Cited

U.S. PATENT DOCUMENTS

| | | |
|---|---|---|
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1* | 6/2011 | Ciesla .................. G06F 3/0202 345/173 |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2014/0043291 A1 | 2/2014 | Ciesla et al. |
| 2014/0160063 A1 | 6/2014 | Yairi et al. |
| 2014/0160064 A1 | 6/2014 | Yairi et al. |

FOREIGN PATENT DOCUMENTS

| | | |
|---|---|---|
| CN | 1882460 A | 12/2006 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A2 | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Lind. "Two Decades of Negative Thermal Expansion Research: Where Do We Stand?" Department of Chemistry, The University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

* cited by examiner

DYNAMIC TACTILE INTERFACE

CROSS-REFERENCE TO RELATED APPLICATIONS

This application claims benefit of U.S. Provisional Application No. 61/874,902, filed on Sep. 6, 2013, which is incorporated in its entirety by this reference.

This application is related to U.S. application Ser. No. 13/414,589, filed on Mar. 7, 2012; U.S. application Ser. No. 12/652,708, filed on Jan. 5, 2010, U.S. application Ser. No. 13/481,676, filed on May 25, 2012; U.S. application Ser. No. 14/081,519, filed on Nov. 15, 2013; and U.S. application Ser. No. 13/896,098, filed on May 15, 2013, all of which are incorporated in their entireties by this reference.

TECHNICAL FIELD

This invention relates generally to the field of touch-sensitive displays and more specifically to a dynamic tactile interface for a touch-sensitive display.

DESCRIPTION OF THE PREFERRED EMBODIMENTS

Figure 1A:
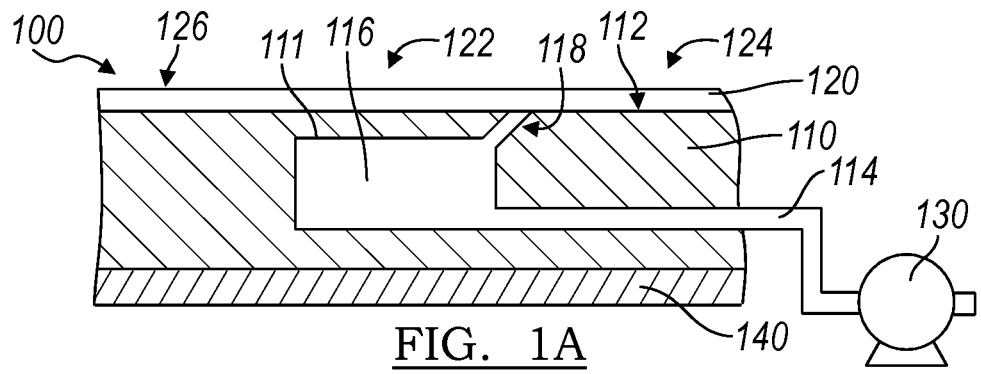
FIGS. 1A and 1B are schematic representations of a dynamic tactile interface in accordance with the invention.
Figure 1B:
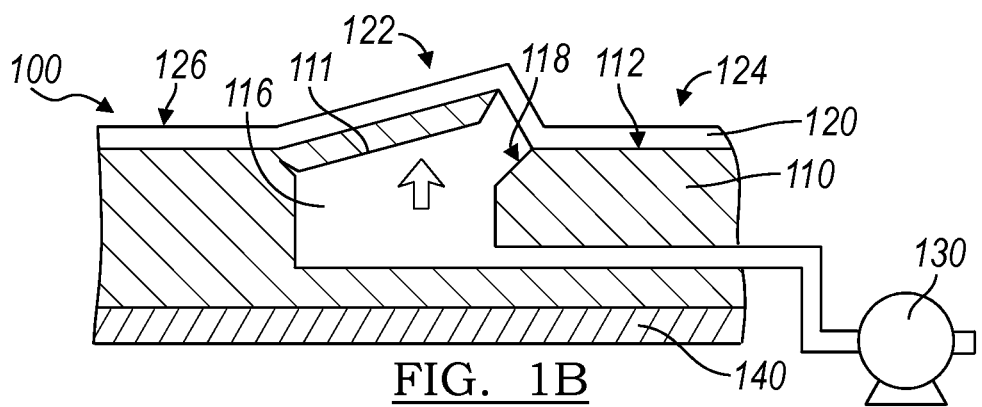

The following description of the preferred embodiments of the invention is not intended to limit the invention to these preferred embodiments, but rather to enable any person skilled in the art to make and use this invention.

1. Dynamic Tactile Interface

A dynamic tactile interface includes: a substrate 110 including a fluid conduit 116, a shelf 118 adjacent the fluid conduit 116, and a fluid channel 114 fluidly coupled to the fluid conduit 116; a flap 111 including a distal end and a proximal end, the flap 111 extending across the fluid conduit 116 and hinged to the substrate 110 at the proximal end; a tactile layer 120 including a peripheral region 124 coupled to the substrate 110, a deformable region 122 adjacent the peripheral region 124 and arranged over the flap 111, and a tactile surface 126 opposite the substrate 110; and a displacement device displacing fluid into the fluid channel 114 and through the fluid conduit 116 to transition the deformable region 122 from a retracted setting into an expanded setting, the distal end of the flap 111 engaging the shelf 118 in the retracted setting, and the distal end of the flap 111 lifted off of the shelf 118 and the deformable region 122 defining a formation tactilely distinguishable from the peripheral region 124 in the expanded setting.

A variation of the dynamic tactile interface further includes a sensor coupled to the substrate 110 and outputting a signal according to an input on the tactile surface 126.

Figure 16A:
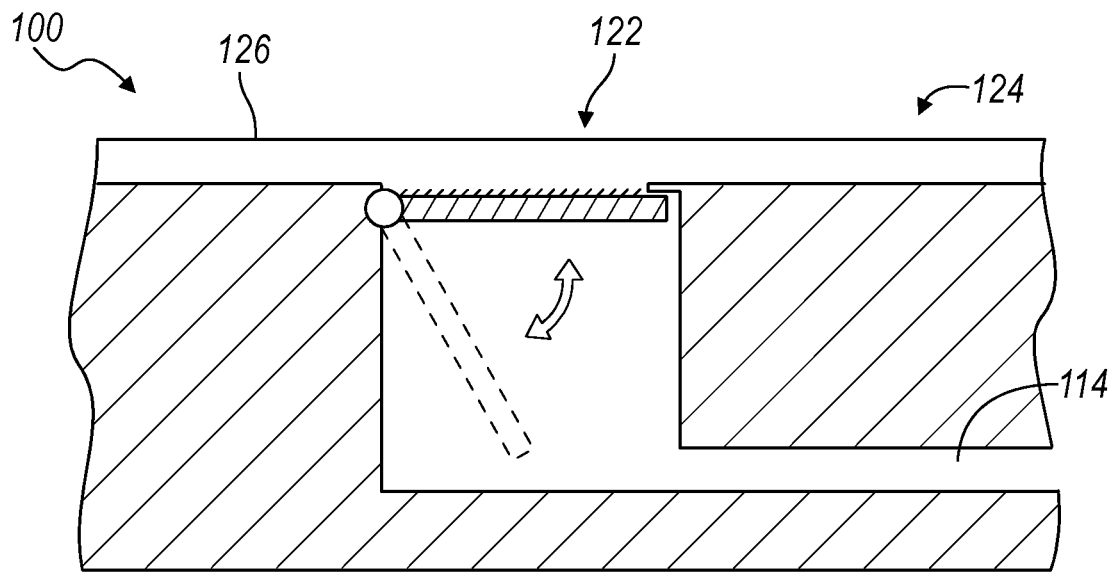
FIGS. 16A and 16B are schematic representation of variations of the dynamic tactile interface.
Figure 16B:
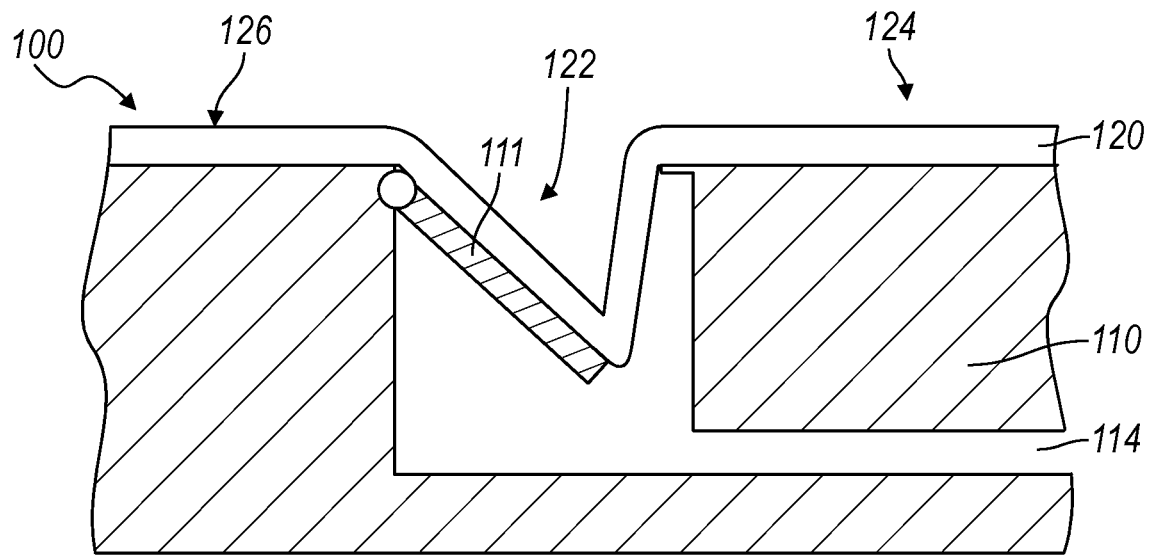

Another variation of the dynamic tactile interface, shown in FIGS. 16A and 16B, includes: a substrate 110 including a fluid conduit 116, a shelf 118 adjacent the fluid conduit 116, and a fluid channel 114 fluidly coupled to the fluid conduit 116; a flap 111 including a distal end and a proximal end, the flap 111 extending across the fluid conduit 116 and hinged to the substrate 110 at the proximal end; a tactile layer 120 including a peripheral region 124 coupled to the substrate 110, a deformable region 122 adjacent the peripheral region 124 and arranged over the flap 111, and a tactile surface 126 opposite the substrate 110; a displacement device displacing fluid into the fluid channel 114 and through the fluid conduit 116 to transition the deformable region 122 from a retracted setting into an expanded setting, the distal end of the flap 111 engaging the shelf 118 in the flush expanded setting, and the distal end of the flap 111 below the shelf 118 and the deformable region 122 defining a formation tactilely distinguishable from the peripheral region 124 in the depressed retracted setting; and a sensor coupled to the substrate 110 and outputting a signal according to an input on the tactile surface 126.

2. Applications

The dynamic tactile interface can define a deformable region 122, which can selectively expand and retract to provide intermittent tactile guidance at the tactile surface 126, such as for a user interacting with a computing device incorporating the dynamic tactile interface. For example, the dynamic tactile interface can be integrated into or applied over a touchscreen of a smartphone, a tablet, a personal data assistant (PDA), a personal music (e.g., MP3) player, a watch, a wearable device, or an other mobile computing device to selectively and intermittently represent physical hard keys (e.g., round or rectangular buttons) substantially aligned with input keys rendered on an adjacent display, such as physical hard keys aligned with alphanumeric characters of a keyboard rendered on the adjacent display. The dynamic tactile interface can be similarly applied over or incorporated into an automotive console, a machine tool control panel, a stereo system, a thermostat, residential lighting controls, or any other control system or computer device to provide tactile guidance to a user supplying an input into the system or device. The dynamic tactile interface can additionally or alternatively function to modify a texture across a portion of the tactile surface 126 with one or more deformable regions of substantially small area across the tactile surface 126.

The dynamic tactile interface can be applied over or integrated into a display. The dynamic tactile interface can be substantially transparent, such as described in U.S. patent application Ser. No. 13/414,589, which is herein incorporated in its entirety by this reference. In this implementation, the dynamic tactile interface can also set vertical positions (e.g., heights above the peripheral region 124) of one or more deformable regions to modify optics of the dynamic tactile interface for light output from the display. The dynamic tactile interface can also set vertical positions of one or more deformable regions to provide distinct tactilely distinguishable features across the tactile surface 126.

Generally, the displacement device 130 of the dynamic tactile interface displaces fluid into and out of the fluid channel 114 to transition the deformable region 122 of the dynamic tactile interface between retracted and expanded settings. In one implementation, the deformable region 122 can be substantially flush with the adjacent peripheral region 124 in the retracted setting, such that the surface geometry is substantially continuous (e.g., flat, planar, smooth) across the deformable region 122 and the peripheral region 124 in the retracted setting. In this implementation, fluid displaced into the fluid channel 114 can expand the deformable region 122, thereby elevating the deformable region 122 above the peripheral region 124 in the expanded setting. In another implementation, the deformable region 122 can be substantially flush with the adjacent peripheral region 124 in the expanded setting and offset below the peripheral region 124 in the retracted setting.

The flap 111 can extend from the substrate 110, the flap coupled to the substrate by a hinge connecting a proximal end of the flap 111 to the substrate 110. The flap 111 can also be coupled to the deformable region 122, such that the flap 111 can pivot away from the shelf 118 as the deformable region 122 transitions between the expanded and retracted settings. For example, fluid pressure within the fluid conduit 116 can push the flap 111 away from the fluid conduit 116 and the shelf 118, such that a distal end of the flap 111 is raised at an angle above the shelf 118. The flap 111 supports the deformable region 122 in the expanded setting. Thus, in the expanded setting, the tactile layer 120 can stretch over the distal end of the flap 111, yielding a tactilely-distinguishable "sharp" or edge across a portion of the deformable region 122. In the retracted setting, the flap 111 can rest on the shelf 118 such that the deformable region 122 can lie flush with the peripheral region 124. The shelf 118 can support the flap 111 and, thus, the flap 111 can support the deformable region 122 in the retracted setting. Accordingly, the tactile layer 120 can appear (tactilely and optically) to a user as seamless, smooth, and continuous across the peripheral and deformable regions in the retracted setting. The flap 111 can, therefore, function as a support surface beneath the tactile layer 120 to substantially mitigate tactilely discernible abnormalities (e.g., an edge of the fluid conduit 116) when the deformable region 122 is in the retracted setting and substantially flush with the peripheral region 124. The flap 111 can also function to alter or control a form or shape of the deformable region 122 in the expanded setting.

The dynamic tactile interface can, therefore, enable selective and intermittent deformation of one or more deformable regions between a retracted setting and an expanded setting to provide tactile (e.g., haptic) guidance to a user interacting with a connected computing device, such as a smartphone or tablet.

3. Substrate

The substrate 110 includes a fluid conduit 116, a shelf 118 adjacent the fluid conduit 116, and a fluid channel 114 fluidly coupled to the fluid conduit 116. Generally, the substrate 110 functions to support the tactile layer 120 and to define the fluid conduit 116 through which fluid travels to and from the deformable region 122 of the tactile layer 120 (via the fluid channel 114 and fluid conduit 116) to enable expansion and retraction of the deformable region 122.

The substrate 110 can be substantially transparent or translucent. For example, in one implementation, wherein the dynamic tactile interface includes or is coupled to a display, the substrate 110 can be substantially transparent and transmit light output from an adjacent display. The substrate 110 can be PMMA, acrylic, and/or of any other suitable transparent or translucent material. Alternatively, the substrate 110 can be opaque or otherwise substantially non-transparent or translucent.

The substrate 110 can define (or cooperate with the tactile layer, a display, etc. to define) the fluid conduit 116 that communicates fluid from the fluid channel 114 to the deformable region 122 of the tactile layer. The fluid conduit 116 can substantially correspond to (e.g., be adjacent) the deformable region 122 of the tactile layer. The fluid conduit 116 can be machined, molded, stamped, etched, etc. into or through the substrate 110 and can be fluidly coupled to the fluid channel 114, the displacement device 130, and the deformable region 122. A bore intersecting the fluid channel 114 can define the fluid conduit 116, such that fluid can be communicated from the fluid channel 114 to the deformable layer to transition the deformable region 122 (adjacent the fluid conduit 116) between the expanded and retracted settings. The axis of the fluid conduit 116 can be normal a surface of the substrate 110, can be non-perpendicular with the surface of the substrate 110, of non-uniform cross-section, and/or of any other shape or geometry.

Figure 3A:
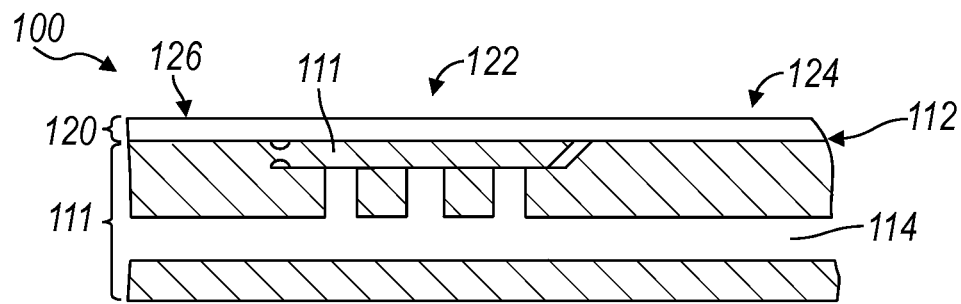
FIGS. 3A and 3B are schematic representations of one variation of the dynamic tactile interface.
Figure 3B:
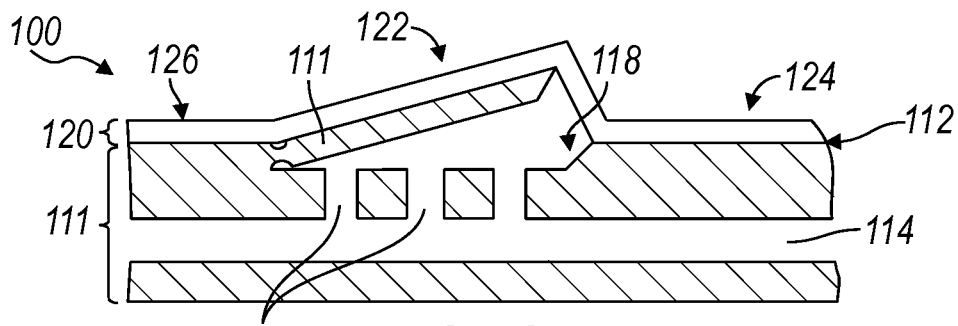
Figure 4A:
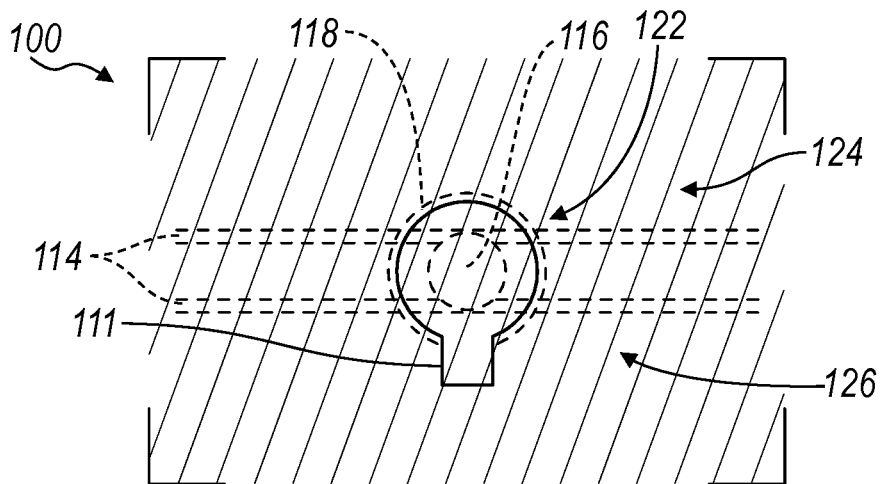
FIGS. 4A and 4B are schematic representations of one variation of the dynamic tactile interface.
Figure 4B:
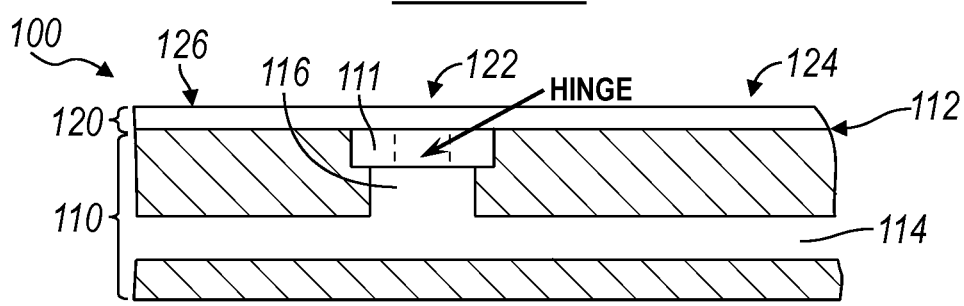

The substrate 110 can define a shelf 118 within the fluid conduit 116. The shelf 118 can extend from a boundary of the fluid conduit 116 into the fluid conduit 116. The substrate 110 can define the shelf 118 that is physically coextensive with a bore of the fluid conduit 116, wherein the shelf 118 is offset from the bore of the fluid conduit 116 opposite the flap 111. Alternatively, the shelf 118 can define a detent in the substrate no and the boundary of the fluid conduit 116. The shelf 118 can define a square shoulder, a curvilinear shoulder, or boss of any other form. The shelf 118 can also extend around the bore, such as in the form of a counterbore or countersink around the center bore of the fluid conduit 116, as shown in FIGS. 4A and 4B. The fluid conduit 116 can also define a cluster of bores, and the flap 111 can cover the cluster of bores, as shown in FIGS. 3A and 3B. The substrate 110 can define the shelf 118 such that the shelf 118 can support the flap 111 from below or from above. For example, the shelf 118 can support the flap 111 and the tactile layer 120 such that the deformable region 122 is flush with the peripheral region 124 in the retracted setting and substantially prevent inward deformation of the shelf 118 and the deformable region 122 into the fluid conduit 116.

In an variation of the dynamic tactile interface, the shelf 118 can form a support that substantially prevents the flap 111 from rotating from the depressed retracted setting to a position offset above the peripheral region 124. For example, in the depressed retracted setting, the flap 111 can extend into the fluid conduit 116 and below the peripheral region 124. In this example, the shelf 118 can prevent the flap 111 and the deformable region 122 from extending above flush with the peripheral region 124 in the flush expanded setting. Thus, the shelf 118 can retain the flap 111 within the fluid conduit 116.

The substrate 110 can define (or cooperate with the sensor, a display, etc. to define) the fluid channel 114 that communicates fluid through or across the substrate 110 to the fluid conduit 116. For example, the fluid channel 114 can be machined or stamped into the back of the substrate 110 opposite the attachment surface 112, such as in the form of an open trench or a set of parallel open trenches. The open trenches can then be closed with a substrate backing layer, the sensor, and/or a display to form the fluid channel 114. A bore intersecting the open trench and passing through the attachment surface 112 can define the fluid conduit 116, such that fluid can be communicated from the fluid channel 114 to the deformable layer to transition the deformable region 122 (adjacent the fluid conduit 116) between the expanded and retracted settings. The axis of the fluid conduit 116 can be normal the attachment surface 112, can be non-perpendicular with the attachment surface 112, of non-uniform cross-section, and/or of any other shape or geometry. Likewise, the fluid channel 114 be normal the attachment surface 112, can be non-perpendicular with the attachment surface 112, of non-uniform cross-section, and/or of any other shape or geometry. However, the fluid channel 114 and the fluid conduit 116 can be formed in any other suitable way and be of any other geometry.

The attachment surface 112 of the substrate 110 functions to retain (e.g., hold, bond, and/or maintain the position of) the peripheral region 124 of the tactile layer 120. In one implementation, the substrate 110 is planar across the attachment surface 112, such that the substrate 110 retains the peripheral region 124 of the tactile layer 120 in planar form, such as described in U.S. patent application Ser. No. 12/652,708. However, the attachment surface 112 of the substrate 110 can be of any other geometry and retain the tactile layer 120 in any other suitable form.

4. Flap

The flap 111 includes a distal end and a proximal end, the flap 111 extending across the fluid conduit 116 and hinged to the substrate 110 at the proximal end. Generally, the flap 111 functions to support the deformable region 122 of the tactile layer. The flap 111 can function to support the deformable region 122 against inward deformation (e.g., into the fluid conduit 116) in response to a force applied to the tactile surface 126. The flap 111 can also function to provide a substantially rigid support for the deformable region 122 of the tactile layer 120 and, thus, in cooperation with the deformable region 122, define a tactilely distinguishable feature, such as an edge, in the expanded setting.

In one implementation, the flap 111 can be substantially transparent or translucent. For example, in one implementation, wherein the dynamic tactile interface includes or is coupled to a display, the flap 111 can be substantially transparent and transmit light from the display across the dynamic tactile interface. The flap 111 can be PMMA, acrylic, or any other suitable material. Alternatively, the flap 111 can be opaque or otherwise non-transparent or translucent.

The flap 111 can define a square, rectangular (shown in FIG. 11A), triangular (shown in FIG. 12A), circular (shown in FIG. 4A), semi-circular, ellipsoidal, or any other suitable perimeter geometry or form across the fluid conduit 116. The flap 111 can also define any suitable side, edge, or corner geometry, such as filleted corners, chamfered sides, radiused sharps, etc. about the edges of the flap 111. For example, the edges of the flap 111 can be radiused to substantially minimize a risk of tearing the tactile layer 120 proximal an edge of the flap 111 when the adjacent deformable region 122 is expanded.

In one implementation, the flap 111 is substantially uniform in thickness. For example, the flap 111 can form a rectilinear volume with uniform thickness across the flap 111, forming a plate. The flap 111 can define a cross-section that substantially corresponds to or conforms to the cross-section of the fluid conduit 116. For example, the fluid conduit 116 can define a bore with a circular cross-section of a first diameter; and the flap 111 can define a circular cross-section of the first diameter. Alternatively, the flap 111 can define a circular cross-section of a diameter slightly less than the first diameter (i.e., undersized), such that the flap 111 fits within the bore of the fluid conduit 116. The flap 111 can also define the circular cross-section of a diameter slightly larger than the first diameter (i.e., oversized), such that flap 111 fits snuggly within the fluid conduit 116 when pressed into the fluid conduit 116, such as by a user.

The flap 111 can also be of a non-uniform thickness. The flap 111 can substantially conform to the shape of the fluid conduit 116. For example, the fluid conduit 116 can form a hemicircular or hemispherical negative recess in the substrate 110. The flap 111 can define a hemicircular or hemispherical positive body that engages (e.g., fits within) the fluid conduit 116 and defines an exterior surface across which the deformable region is connected. The flap 111 can also form a substantially rectilinear volume that tapers along the length of the flap 111. For example, the flap 111 and the substrate 110 can cooperate to define a living hinge along a proximal end of the flap 111, the proximal end of the flap 111 of a thickness less than a thickness of the distal end of the flap 111.

Figure 2A:
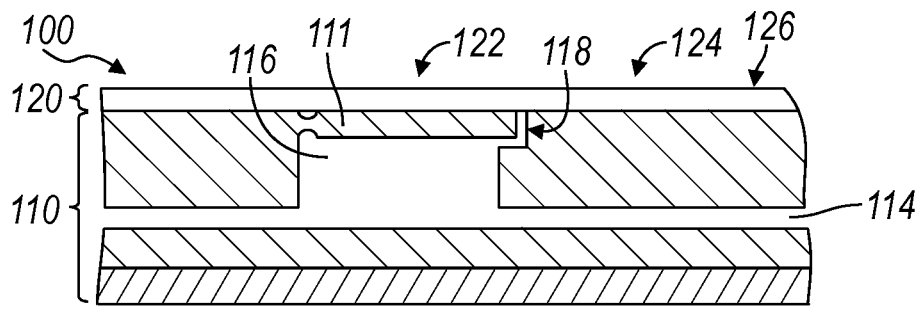
FIGS. 2A and 2B are schematic representations of one variation of the dynamic tactile interface.
Figure 2B:
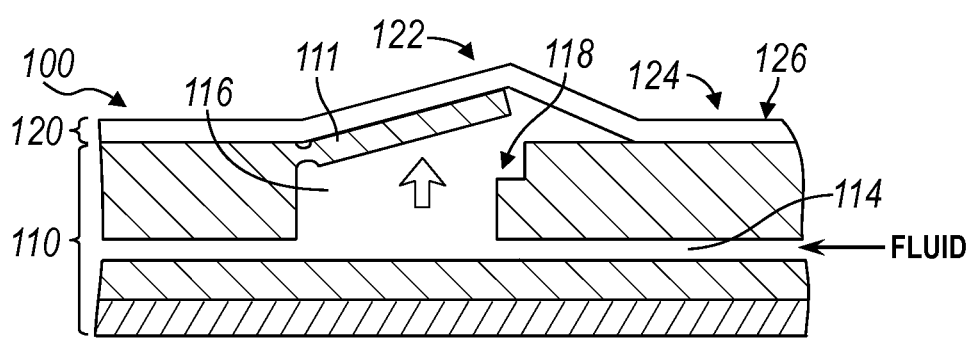

In one implementation, the flap 111 and the substrate 110 can be physically coextensive. Generally, in this implementation, the flap 111 and substrate 100 can define a continuous structure, the flap 111 extending continuously from the substrate 110. The flap 111 can be coupled to the substrate 110 through a living hinge (i.e., a flexible hinge defined by a continuous piece of material). The living hinge can define a rotational degree of freedom for the flap 111 such that the flap 111 can rotate about an axis corresponding to the living hinge. For example, the flap 111 can be of a uniform cross-section along the length of the flap 111 from the distal end of the flap (i.e., the end of the flap distal the substrate) to the proximal end of the flap (i.e., the end of the flap proximal the connection to the substrate) A junction between the proximal end of the flap 111 and the substrate 110 can be of a cross-sectional area less than that of (a main section of) the flap 111 to define a living hinge, as shown in FIG. 2A. In this example, features of the living hinge of the flap 111 can be substantially small and/or fluid indexed-matched to materials of the flap 111 and/or the substrate 110 such that the flap 111 remains substantially optically imperceptible to a user. Flexure of the flap 111 can occur about the living hinge, yielding arcuate deflection of the flap 111 about the hinge as the deformable region 122 above transitions between the retracted and expanded settings, as shown in FIG. 2B.

The flap 111 and the substrate 110 can also cooperate to define a flexible member across the proximal end of the flap 111. Generally, the flap 111 and the substrate no can cooperate to define the flap 111, such that the flap 111 can deflect or deform from an initial position through local deformation of the flap 111 and global deformation and strain of the flap 111 is minimized. Thus, the flap 111 can flex or deform about the proximal end of the flap from a substantially planar configuration to a bent configuration through local deformation. Alternatively, the cross-section of the flap 111 can be uniform along the length of the flap 111 (shown in FIG. 11B,), tapered (shown in FIG. 12C) or of any other suitable shape, geometry, or cross-section, such as shown in FIGS. 13A-13E.

Furthermore, the hinge can be of a transparent elastomeric material or any other suitable material different from the substrate 110 material. In another example, the flap 111 and the substrate 110 can cooperate to define the living hinge along the proximal end of the flap 111, the proximal end of the flap 111 of a thickness less than a thickness of the distal end of the flap 111. Thus, the proximal end of the flap 111 can, in cooperation with the substrate 110, define the living hinge.

As shown in FIGS. 1A and 2A, in the retracted setting, the flap 111 can extend across and cover the fluid conduit 116 with the distal end of the flap 111 supported by the shelf 118 defined by the substrate 110, such that the deformable region 122 is mechanically supported against inward deformation passed a plane of the peripheral region 124. In particular, the flap 111 can extend across the fluid conduit 116 to cover tactilely (and optically) discernible abnormalities over/across the substrate 110 when the deformable region 122 is in the retracted setting, and the flap 111 can alter or control a form of the deformable region 122 in the expanded setting.

In one example, the flap 111 can engage a shelf 118 defined by the substrate 110, the shelf 118 defining a first chamfered support edge adjacent the tactile layer. The distal end of the flap 111 defines a second chamfered edge that mirrors the first chamfered edge, such that the first chamfered edge and the second edge contact and the outer surface of the flap 111 lies flush with the attachment surface 112 in the retracted setting. The second chamfered edge can lift off the first chamfered edge as the deformable region 122 transitions into the expanded setting. The chamfered edge can thus form a sharp corner tactilely distinguishable along the deformable region 122 once the deformable region 122 and the flap 111 transition into the expanded setting. Alternatively, the flap 111 can engage the shelf 118 in the retracted setting, the shelf 118 forming a square shoulder, a curvilinear shoulder, or a boss or shoulder of any other form.

In another example, the flap 111 can engage a shelf 118 that is physically coextensive with a bore of the fluid conduit 116, wherein the shelf 118 is offset from the bore of the fluid conduit 116 opposite the hinge of the flap 111, as shown in FIGS. 2A and 2B. Alternatively, the shelf 118 can extend around the bore, such as in the form of a counterbore or countersink around the bore of the fluid conduit 116, as shown in FIGS. 4A and 4B. Yet alternatively, the fluid conduit 116 can define a cluster of bores, and the flap 111 can cover the cluster of bores, as shown in FIGS. 3A and 3B.

The flap 111 and the shelf 118 can cooperate to form a seal to seal the deformable region 122 from fluid when in the retracted setting. Alternatively, a portion of a side of the flap 111 can be offset from the shelf 118 or edge of the bore of the fluid conduit 116 to enable communication of fluid between the fluid conduit 116 and the deformable region 122 of the tactile layer. For example, fluid communicated from the fluid conduit 116, past the flap 111, and into the deformable region 122 of the tactile layer 120 in order to expand the deformable region 122. Likewise, fluid communicated from the deformable region 122, past the flap 111, and into the fluid conduit 116 to retract the deformable region 122. Alternatively, the flap 111 can include one or more ports to communicate fluid between the fluid conduit 116 and the deformable region 122. In this implementation, the displacement device 13o can displace fluid into the fluid channel 114, such that fluid moves laterally through the fluid channel 114, then vertically upward toward the deformable region 122 via the fluid conduit 116, then into the deformable region 122 through one or more ports in the flap 111.

In the foregoing implementation in which the flap 111 and the substrate 110 are continuous, the flap 111 can be defined by cutting the perimeter of the flap 111 into the substrate 110. For example, a five-axis and/or articulating laser head can cut the substrate 110 to free the distal end of the flap 111 from the substrate 110 proximal the fluid conduit 116. Alternatively, the fluid channel 114, fluid conduit 116, and flap 111 can be micromachined into the substrate 110 through bulk micromachining techniques. The substrate 110 and foregoing features can be molded through fused deposition modeling techniques. However, the substrate 110, fluid channel 114(s), fluid conduit 116, flap 111, etc. can be manufactured in any other suitable way.

The flap 111 can alternatively define a discrete component coupled to the substrate 110 over the fluid channel 114. The flap 111 can be mechanically retained by a (transparent) fastener or mechanical feature on the substrate 110. For example, the substrate 110 can define a male component of a hinge and the flap 111 can define a female component of a hinge. The substrate 110 and the flap 111 can be mated to complete the hinge with the flap 111 pivotable about an axis of the hinge. Alternatively, the flap 111 can be bonded to the substrate 110, such as with an adhesive or through diffusion bonding.

In another implementation, the flap 111 can include a pedestal 113 extending into the fluid conduit 116 and engaging the shelf 118 in the retracted setting. For example, the flap 111 can include a pedestal 113 or piston that extends from the flap 111 and passes into the fluid conduit 116 to rest on the shelf 118 or a ridge within the fluid conduit 116 to support the flap 111—and thus the deformable region 122—against inward deformation in the retracted setting. Alternatively, the pedestal 113 can engage a bottom of the fluid conduit 116. For example, the flap 111 can include a foot or leg that extends from the flap 111 into the fluid conduit 116. In the retracted setting, the foot engages the bottom of the fluid conduit 116. In the expanded setting, the foot can be suspended within the fluid conduit 116. Alternatively, the foot can engage a shelf 118, edge, platform, etc. within the fluid conduit 116 (e.g., extending from a wall of the fluid conduit 116 or from the bottom) to rigidly support the deformable region 122 in the expanded setting.

In another implementation, the flap 111 can be arranged such that an edge of the flap 111 is substantially aligned with a perimeter of an image of a key rendered on a display coupled to the tactile layer. In particular, the distal end of the flap 111 can define a chamfer interfacing with the shelf 118, an edge of the chamfer forming a sharp in an adjacent portion of the deformable region 122 substantially aligned with a portion of the perimeter of the image of the key rendered on the display in the expanded setting. Likewise the proximal end of the flap 111 connecting the flap 111 to the substrate 110 can coincide with a portion of the perimeter of the image of the key rendered on the display. Thus, the flap 111 can substantially correspond to the image of the key and function as a tactilely distinguishable button representing and coinciding with a virtual image of a key.

5. Tactile Layer

The tactile includes a peripheral region 124 coupled to the substrate 110, a deformable region 122 adjacent the peripheral region 124 and arranged over the flap 111, and a tactile surface 126 opposite the substrate 110. Generally, the tactile layer 120 functions to elastically expand into a tactilely distinguishable formation offset above the peripheral region 124 at one or more deformable regions as fluid is pumped into the fluid channel 114 and through corresponding fluid conduits by the displacement device 130.

The tactile layer 120 can include an elastic sheet selectively adhered, bonded, fastened, or otherwise coupled to the substrate 110 at the peripheral region 124, as described in U.S. patent application Ser. No. 13/414,589. In one implementation, the tactile layer 120 includes a singular layer, such as a single urethane sheet of uniform thickness. Alternatively, the tactile layer 120 can include multiple sublayers, such as a urethane sublayer opposite the substrate 110. However, the tactile layer 120 can be of any other form, material, thickness, or composition, such as described in U.S. patent application Ser. No. 13/418,676. The tactile layer 120 can be substantially transparent or translucent. For example, the tactile layer 120 can be arranged over a display. Thus, a transparent tactile layer 120 can transmit light from the display across the tactile layer. The tactile layer 120 can also be substantially opaque.

The tactile layer 120 defines a peripheral region 124 and a deformable region 122. The peripheral region 124 can be adhered, bonded, fastened, or otherwise coupled to the substrate 110 at an attachment surface 112 of the substrate 110. In one implementation, the entirety of the peripheral region 124 of the tactile layer 120 can be bonded across the attachment surface 112. In another implementation, the peripheral region 124 can be bonded to the attachment surface 112 at an annular area surrounding the periphery of the fluid conduit 116, such that a portion of the peripheral region 124 outside the annular area is disconnected from the substrate 110 and the attachment surface 112. Alternatively, the peripheral region 124 of the tactile layer 120 can be bonded at any suitable point, line, or area of the substrate 110 and in any other suitable way.

The deformable region 122 of the tactile layer 120 is disconnected from the substrate 110 and arranged over the fluid conduit 116. The deformable region 122 can expand outwardly away from the fluid conduit 116 into the expanded setting in response to displacement of fluid into the fluid channel 114 and through the fluid conduit 116. Alternatively, the deformable region 122 can expand from a depressed retracted setting offset below the peripheral region 124 (e.g., extending into the fluid conduit 116) into the (flush) expanded setting, wherein the deformable region 122 is substantially flush with the peripheral region 124. The displacement device 130 releases fluid pressure within the fluid channel 114 and/or actively pumps fluid back out of the fluid channel 114, and fluid behind the deformable region 122 can recede from the fluid conduit 116 and the fluid channel 114 and the deformable region 122 can return to the retracted setting.

The deformable region 122 can be arranged over the fluid conduit 116 and, thus, can be arranged over the flap 111. In one implementation, the deformable region 122 can be disconnected from the flap 111. Thus, when the displacement device 130 displaces fluid into the fluid channel 114 and through the fluid conduit 116, the fluid pressure increases behind the deformable region 122, causing the deformable region 122 to expand into the expanded setting (or into the flush expanded setting). Likewise, when the displacement device 130 displaces fluid away from the deformable region 122, via the fluid conduits and the fluid channel 114, the fluid pressure behind the deformable region 122 decreases and the deformable region 122 can return to the retracted setting (or to the depressed retracted setting).

Figure 5A:
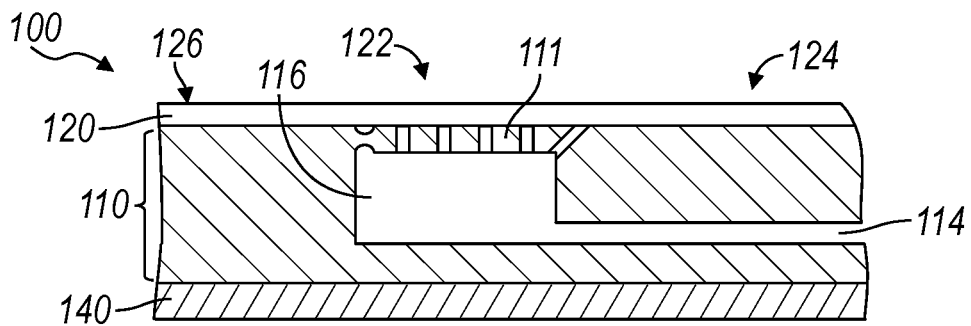
FIGS. 5A and 5B are schematic representations of one variation of the dynamic tactile interface.
Figure 5B:
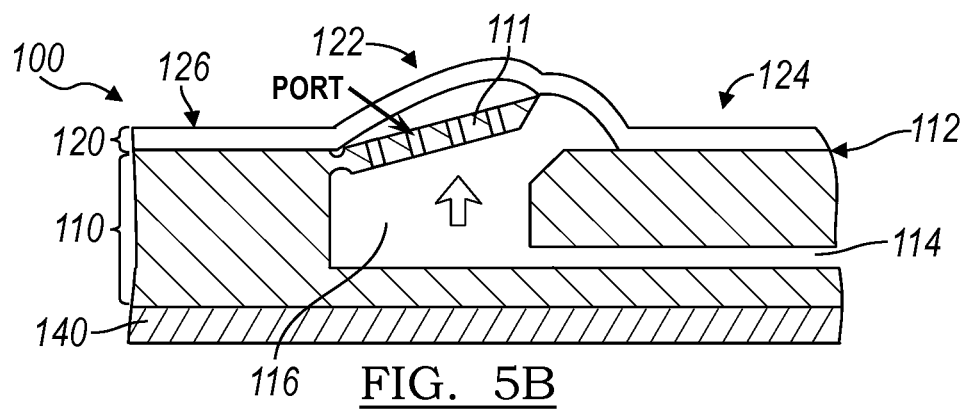
Figure 6:
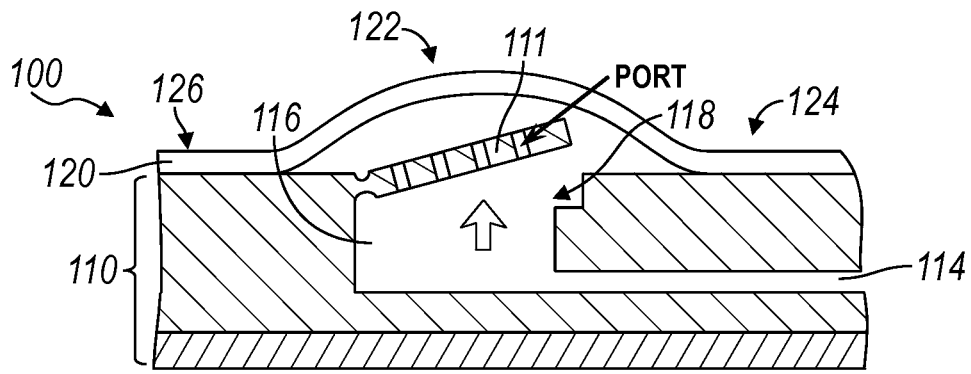
FIG. 6 is a schematic representation of one variation of the dynamic tactile interface.

In a similar implementation, the deformable region 122 can be disconnected from the flap 111. When fluid is displaced through the fluid channel 114 and through the fluid conduit 116, the flap 111 pivots off the shelf 118 to permit fluid to move behind the deformable region 122 and, thus, to transition the deformable region 122 into the expanded setting (or into the flush expanded setting). In this implementation, as shown in FIGS. 5A and 5B, the flap 111 can also include one or more ports through a broad face of the flap 111, a serrated edge, a semi-circular profile at one or more edges, or any other feature through which fluid can drain from behind the deformable region 122 back into the fluid conduit 116 in order to transition the deformable region 122 into the retracted setting. Thus, the flap 111 can be suspended (e.g., float) between the substrate 110 and the deformable region 122 in the expanded setting, as shown in FIG. 6. The flap 111 can retract over the fluid conduit 116 and engage the shelf 118, which supports the deformable region 122 against inward deformation beyond the retracted setting. Alternatively, the flap 111 can retract into the fluid conduit 116 from the flush expanded setting to the depressed retracted setting, the flap 111 supporting the deformable region 122 against inward deformation beyond the depressed retracted setting.

Figure 7:
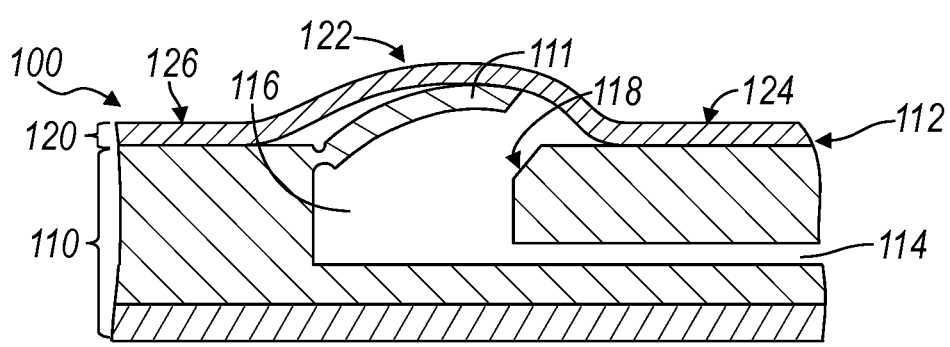
FIG. 7 is a schematic representation of one variation of the dynamic tactile interface.

In an alternative implementation, the deformable region 122 can connect to the flap 111, such that the deformable region 122 retains the flap 111 in the expanded setting and the depressed retracted setting. The deformable region 122 can be coupled to a point, a line, or an area of the broad face of the flap 111. Alternatively, the deformable region 122 can be coupled to an edge or a side of the flap 111. For example, the deformable region 122 can be bonded to the flap 111 across the broad face of the flap 111. Thus, as the deformable region 122 transitions from the retracted setting into the expanded setting (or from the flush expanded setting into the depressed retracted setting), a portion of the tactile layer 120 between the flap 111 and the peripheral region 124 stretches to accommodate a change in fluid pressure behind the deformable region 122, yielding a linearly inclined protrusion with a sharp edge along the distal end of the flap 111, as shown in FIGS. 2B and 3B. In another example, the deformable region 122 can be bonded to the flap 111 along the distal edge of the flap 111 such that, as the deformable region 122 transitions from the retracted setting to the expanded setting, fluid flows between the flap 111 and the deformable region 122, the deformable region 122 expands outward, and the flap 111 lifts off the shelf 118 and retains a portion of the deformable region 122 bonded along the distal edge of the flap 111 to modify the shape of the deformable region 122, as shown in FIG. 5B. In another example, the deformable region 122 can be bonded to the flap 111 at a point, a line, or an area on the broad face of the flap 111 between the distal and proximal ends of the flap 111. A portion of the deformable region 122 adjacent but not bonded to (e.g., disconnected from) the flap 111 stretches to accommodate increased fluid pressure behind the flap 111, lifts the flap 111 off the shelf 118, and applies a torque to the distal end of the flap 111, thus deflecting the flap 111 into a curvilinear form, as shown in FIG. 7.

In the foregoing implementation, the peripheral region 124 of the tactile layer 120 can couple to the substrate 110 at any suitable distance from the flap 111. For example, the peripheral region 124 can be coupled to the substrate 110 substantially proximal the distal end of the flap 111, such that a span of the deformable region 122 between the peripheral region 124 and the flap 111 defines a high angle with the broad face of the substrate 110, as shown in FIG. 3B. Alternatively, the peripheral region 124 can be coupled to the substrate 110 at some distance from the distal end of the flap 111, such that a span of the deformable region 122 between the peripheral region 124 and the flap 111 defines a low angle with the broad face of the substrate 110, as shown in FIG. 2B.

However, the tactile layer 120 can be of any other form and coupled to the substrate 110 and/or flap 111 in any other suitable way.

Figure 8A:
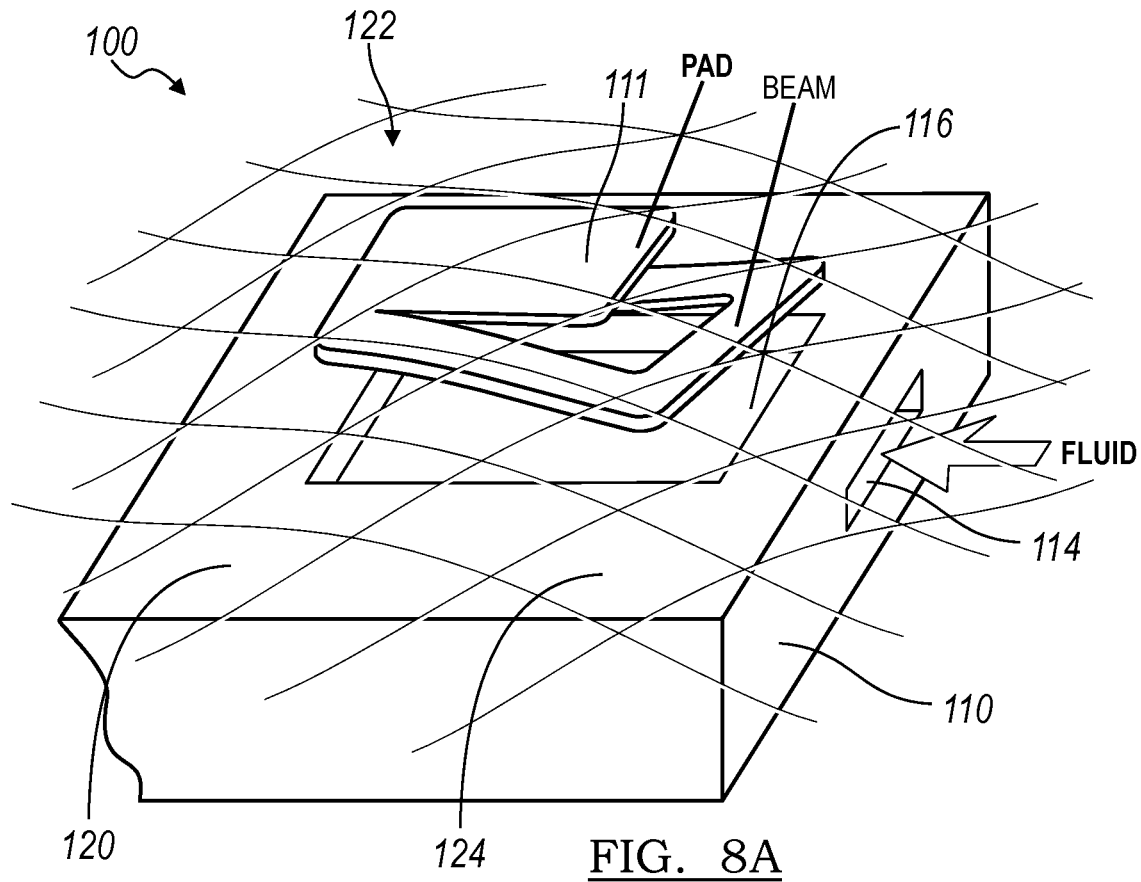
FIGS. 8A and 8B are schematic representations of one variation of the dynamic tactile interface.
Figure 8B:
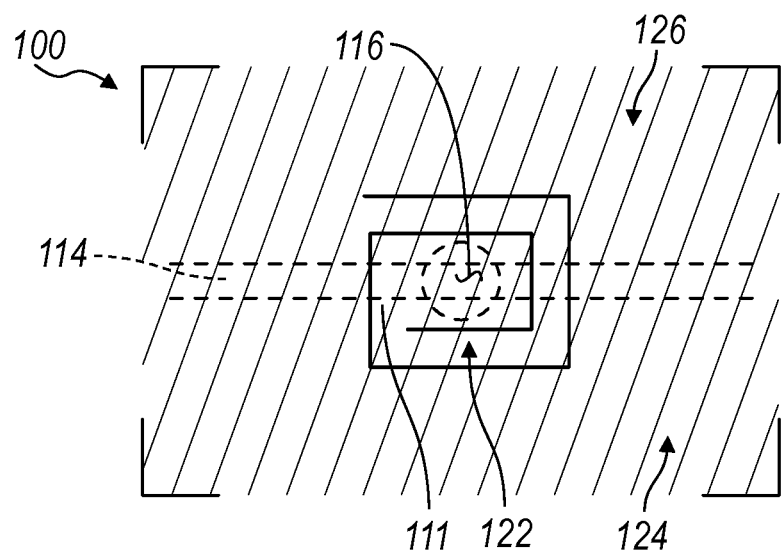

In one variation of the dynamic tactile interface, the flap 111 defines a flexure, as shown in FIGS. 8A and 8B. The flap 111 can define a series of beams joined end-to-end and supporting a pad off of the substrate 110, the deformable region 122 connected to the pad. In this variation, the pad can retain the form of the connected area of the deformable region 122 (e.g., in planar form) in the expanded setting and the beams of the flexure and the pad can support the deformable region 122 against inward deformation in the retracted setting (e.g., via the shelf 118 or a step within the fluid conduit 116, base of the fluid channel 114, or other structure within the substrate 110). In this variation, the flap 111 can also include a pedestal 113 or piston that extends from the flap 111 and passes into the fluid conduit 116 to rest on the shelf 118, ridge within the fluid conduit 116, or a surface of the fluid channel 114 opposite the connection of the pad to the substrate 110 to support the flap 111 (and the deformable region 122) against inward deformation in the retracted setting.

Figure 9A:
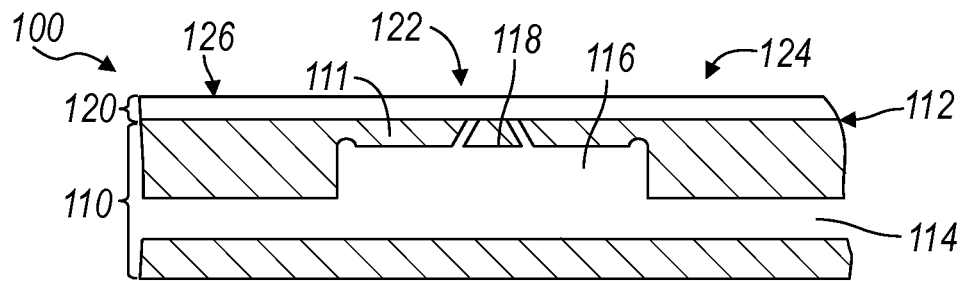
FIGS. 9A and 9B are schematic representations of one variation of the dynamic tactile interface.
Figure 9B:
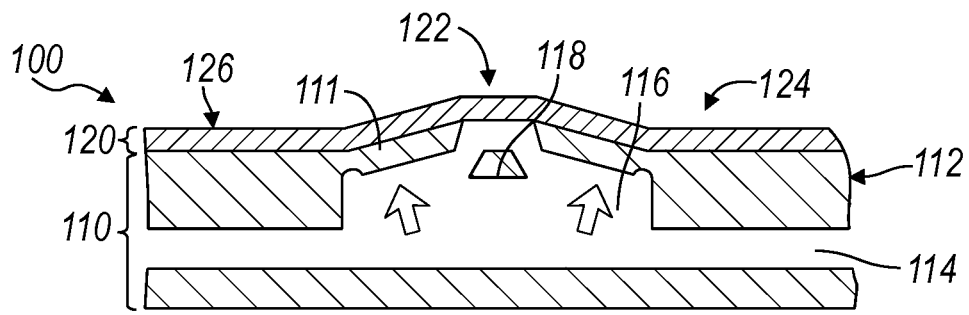

In another variation of the dynamic tactile interface, the substrate 110 defines a pair of flaps with adjacent distal ends and opposing proximal ends and hinges. Both flaps can cover the same fluid conduit 116 or adjacent fluid conduits and a continuous deformable region 122 can be connected to both flaps. The substrate 110 can define a shelf 118 between and configured to support the distal ends of the both flaps. Alternatively, a first flap 111 in the pair of flaps can include a foot or pedestal 113 that extends into the fluid conduit 116 to rest on a shelf 118 or ridge within the fluid conduit 116 or a surface of the fluid channel 114 opposite the proximal end of the first flap 111 to support the first flap 111. The second flap 111 can include a feature on the distal end of the second flap 111 that engages the distal end of the first flap 111, such that the first flap 111 supports the second flap 111. The second flap 111 can additionally or alternatively include a foot or pedestal 113. When fluid is displaced into the fluid channel 114(s) adjacent the pair of flaps, the deformable region 122 can expand outwardly, causing each flap to articulate outwardly. The broad faces of the flaps can retain adjacent portions of the deformable region 122 in planar form as the deformable region 122 expands, and the portion of the deformable region 122 spanning the distal ends of the flaps can stretch, yielding a third substantially planar area across the deformable region 122, as shown in FIGS. 9A and 9B.

Figure 10A:
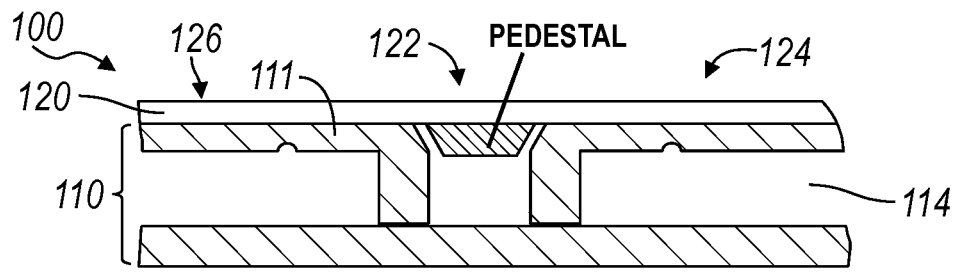
FIGS. 10A and 10B are schematic representations of one variation of the dynamic tactile interface.
Figure 10B:
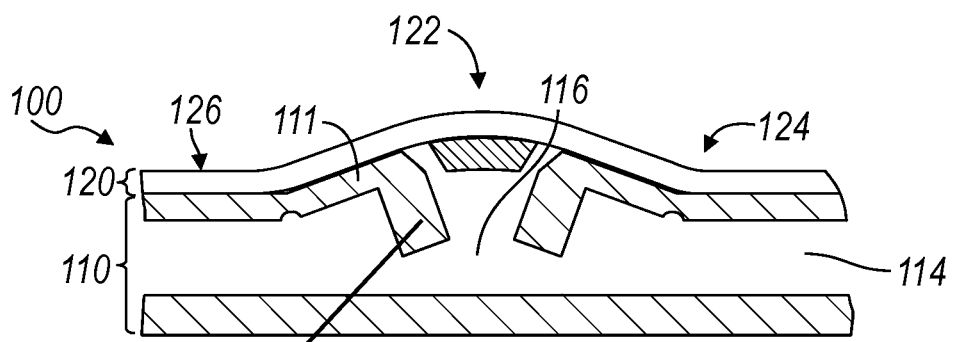

In a similar variation of the dynamic tactile interface, the distal ends of the pair of flaps can be separated by some distance, and the tactile layer 120 can include a pedestal 113 extending toward the substrate 110 between the pair of flaps, as shown in FIGS. 10A and 10B and as described in U.S. patent application Ser. No. 13/481,676. The pedestal 113 can retain a coupled portion of the deformable region 122 in a constant form between the expanded and retracted settings and when a force is applied to the tactile layer 120 over the pedestal 113 in the expanded setting.

Figure 11A:
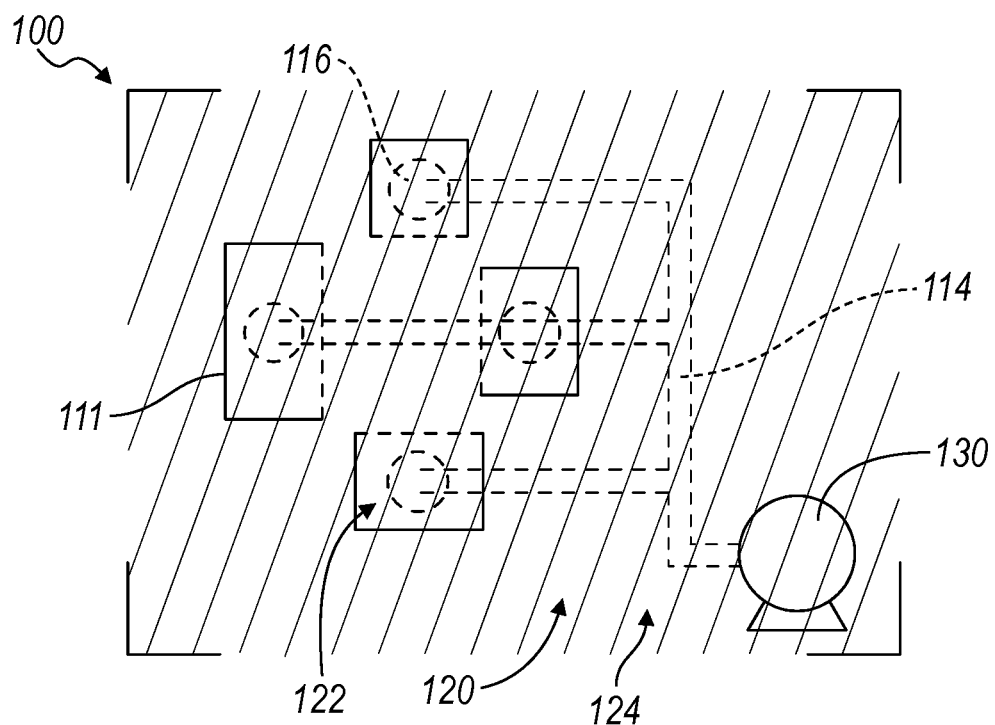
FIGS. 11A and 11B are schematic representations of one variation of the dynamic tactile interface.
Figure 11B:
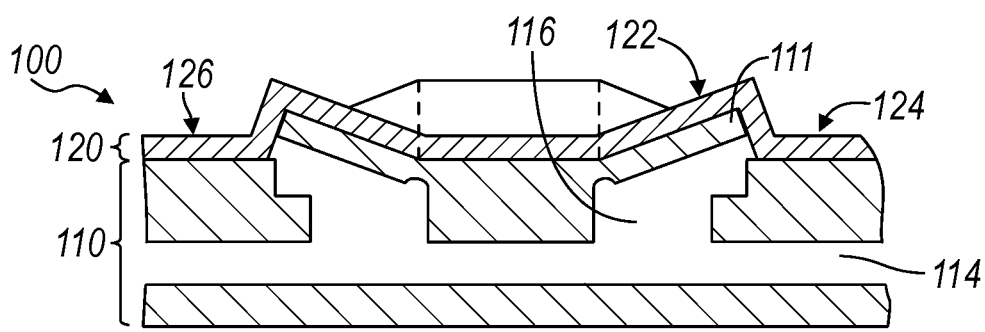

In another variation of the dynamic tactile interface, the substrate 110 can define a set of four flaps patterned radially and equidistant about a center with distal ends of the flaps near the center. The substrate 110 can define four fluid conduits, each coupled to the fluid channel 114 and covered by one flap 111 in the set of flaps. The tactile layer 120 can define four deformable regions, each coupled to one flap 111 in the set of flaps. When the displacement device 130 pumps fluid into the fluid channel 114 and through the fluid conduits, each deformable region 122 can transition into an expanded setting and each flap 111 can create a rectilinear edge on a corresponding deformable region 122, as shown in FIG. 11B. Thus, in this variation, the tactile layer 120 and the substrate 110 can cooperate to mimic a "d pad" of a gaming controller, as shown in FIG. 11A.

Figure 12A:
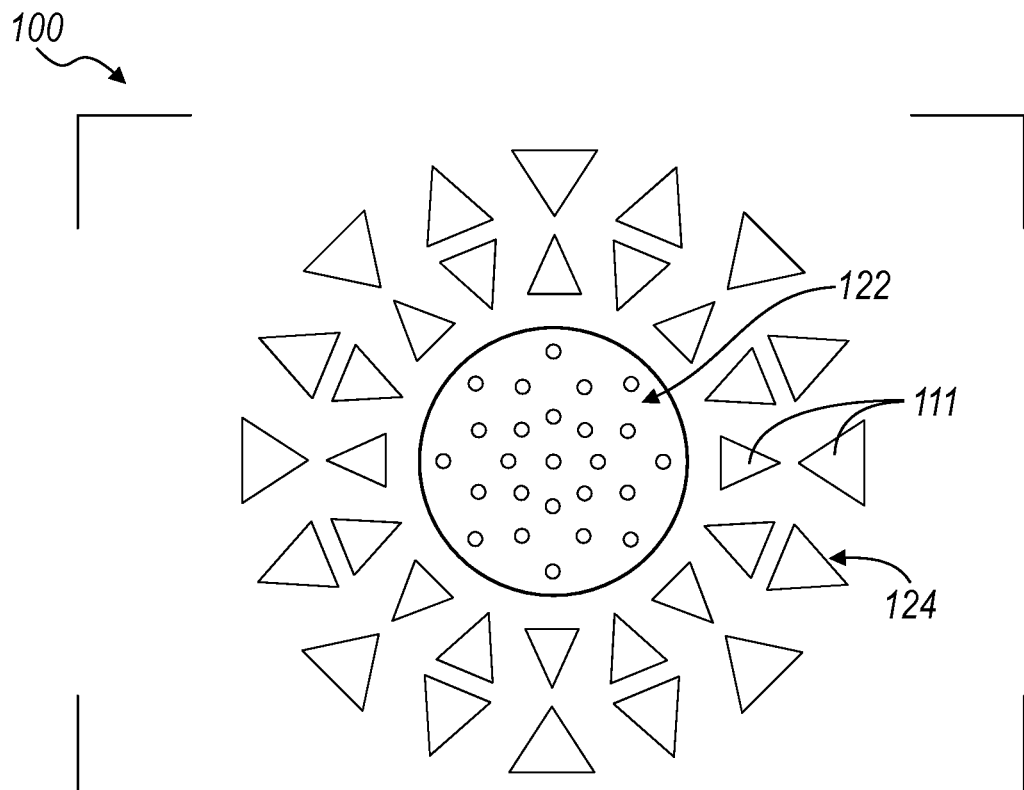
FIGS. 12A, 12B, and 12C are schematic representations of one variation of the dynamic tactile interface.
Figure 12B:
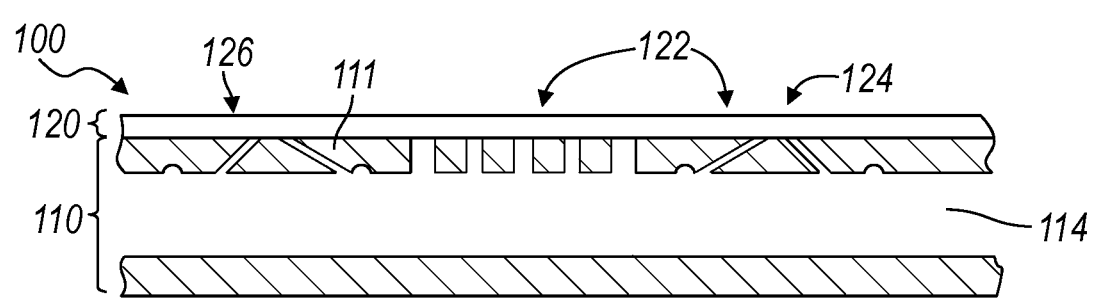
Figure 12C:
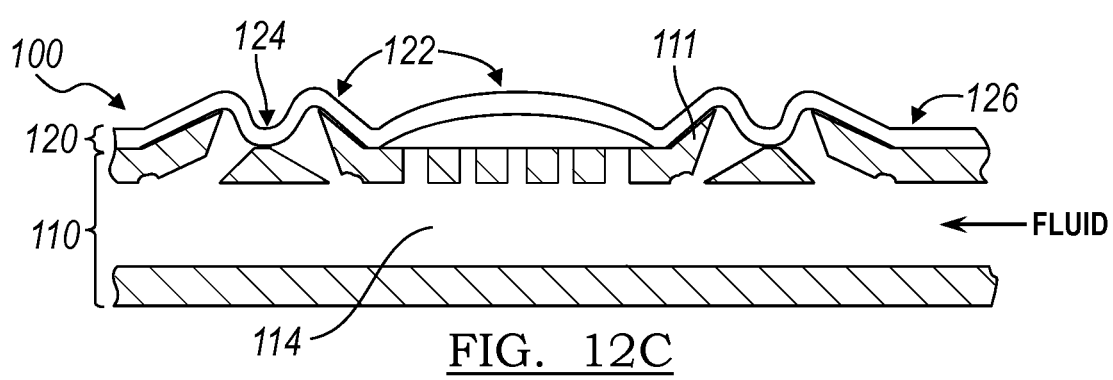
Figure 13A:
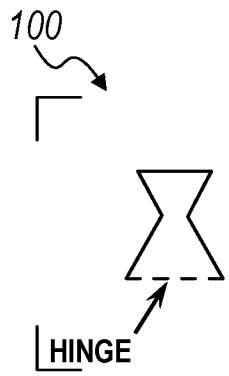
FIGS. 13A-13F are schematic representations of variations of the dynamic tactile interface.
Figure 13B:
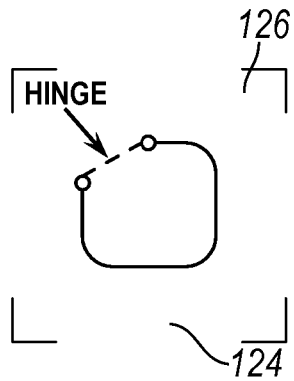
Figure 13C:
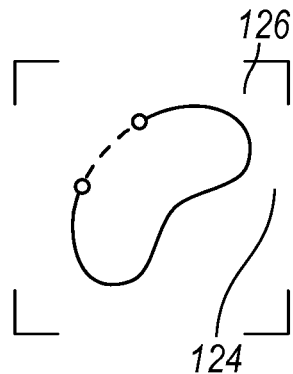
Figure 13D:
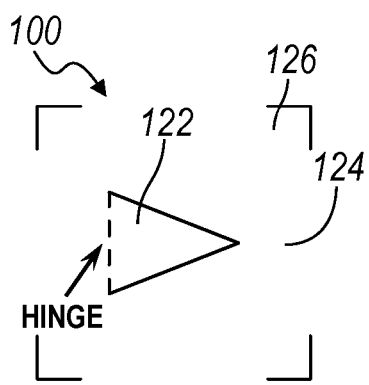
Figure 13E:
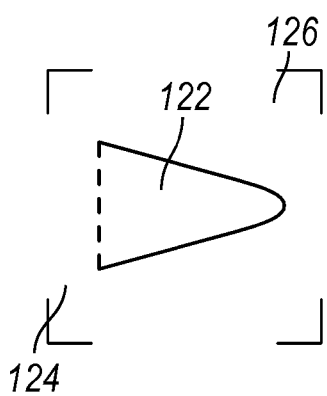
Figure 13F:
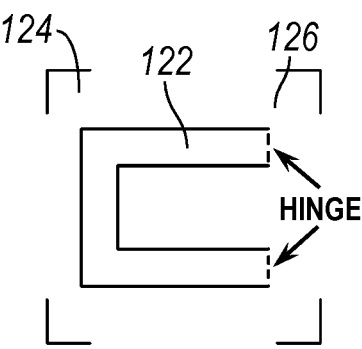

In the foregoing variation, the substrate 110 can include any other number of fluid conduits and corresponding flaps of any other geometry and of any other arrangement. The tactile layer 120 can define any number of deformable regions over the set of flaps. For example, the substrate 110 can define a set of triangular flaps patterned radially about a center with a deformable region 122 as described in U.S. patent application Ser. No. 13/414,589. The deformable region 122 can be arranged at the center and additional deformable regions can be arranged over each flap 111, as shown in FIGS. 12A, 12B, and 12C.

Figure 14A:
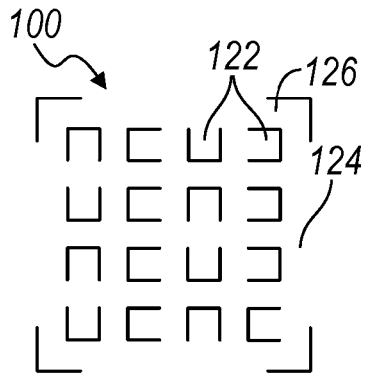
FIGS. 14A, 14B, and 14C are schematic representations of variations of the dynamic tactile interface.
Figure 14B:
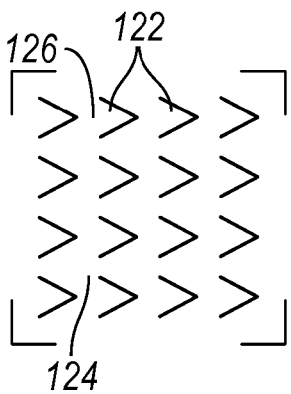
Figure 14C:
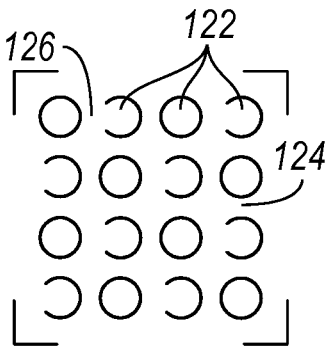

In the foregoing variation, the substrate 110 and the tactile layer 120 can further cooperate to define flap and deformable region pairs that are substantially small such that a user may perceive a texture (or textural) change across the tactile surface 126 when the deformable regions transition between retracted and expanded settings or flush expanded and depressed retracted settings. In this implementation, the substrate no can also define flaps of different perimeter geometries, different end and edge treatments, and/or different orientations across the broad face of the substrate 110 to create different textures across the tactile surface 126, such as shown in FIGS. 14A, 14B, and 14C.

In another variation of the dynamic tactile interface, the substrate 110 defines a flap 111 within a flap 111. The substrate 110 can define a shelf 118 that extends laterally across the fluid conduit 116. The substrate 110 can also define a first flap 111 and a second flap 111, which includes a second distal end and a second proximal end, the first flap 111 extending longitudinally across the fluid conduit 116 toward the shelf 118, the second flap 111 hinged to the substrate 110 at the second proximal end and extending longitudinally across the fluid conduit 116 toward the distal end of the first flap 111. The tactile layer 120 includes a second deformable region 122 adjacent the peripheral region 124 and arranged over the second flap 111; the distal end of the first flap 111 and the second distal end of the second flap 111 simultaneously engaging the shelf 118 in the retracted setting, and the distal end of the flap 111 and the second distal end of the second flap 111 elevated off the shelf 118 and the second deformable region 122 defining a second formation tactilely distinguishable from the peripheral region 124 in the expanded setting. For example, the substrate 110 can include a first rectangular flap 111 hinged to the substrate 110 and bonded to the tactile layer, such as along the full perimeter and/or across the full outer surface of the first flap 111. In this example, the first flap 111 can include a smaller second flap 111 within the perimeter of the first flap 111, wherein the second flap 111 is hinged to the first flap 111. The second flap 111 can be bonded to or disconnected from the tactile layer, and the hinge of the second flap 111 can be parallel or nonparallel to the hinge of the first flap 111. The first flap 111 can also define a shelf 118 or shoulder to support the distal end of the second flap 111 from inward deformation due to a force applied to the tactile layer 120 over the second flap 111 in the retracted setting. In this example, when fluid is pumped through the fluid conduit 116 beneath the first flap 111, the first flap 111 can pivot off of a corresponding shelf 118 in the substrate 110 and reach an equilibrium position based on fluid pressure in the fluid conduit 116 and tension across the tactile layer 120 between an edge of the first flap 111 and the attachment surface 112 of the substrate 110. However, in this example, the fluid pressure under the second flap 111 can cause the second flap 111 to hinge further outward. The first flap 111 can, therefore, yield a first edge in the tactile layer 120 and the second flap 111 can yield a second edge in the tactile layer 120 in the expanded setting.

In a similar variation, the substrate 110 can include a second flap 111 within a first flap 111, wherein the pivots from the depressed retracted setting to the flush expanded setting and the second flap 111 pivots from the retracted setting flush with the first flap 111 and the expand setting offset above the first flap 111. For example, the substrate 110 include a first rectangular flap 111 hinged to the substrate 110 and bonded to the tactile layer, such as along the full perimeter and/or across the full outer surface of the first flap 111. The first flap 111 can include a smaller second flap 111 within the perimeter of the first flap 111, wherein the second flap 111 is hinged to the first flap 111. The second flap 111 can be bonded to or disconnected from the tactile layer. The hinge of the second flap 111 can be parallel or nonparallel to the hinge of the first flap 111. The first flap 111 can pivot from the depressed retracted setting within the fluid conduit 116 and offset below the peripheral region 124 to a flush expanded setting, wherein the first flap 111 lies flush with the peripheral region 124 and engages a shelf 118 that retains the first flap 111 within the fluid conduit 116. The first flap 111 can also define a shoulder or shelf 118 to support the distal end of the second from inward deformation beyond flush with first flap 111 due to a force applied to the tactile layer 120 over the second flap 111 in the retracted setting. When the displacement device pumps fluid through the fluid channel and thus into the fluid conduit 116 beneath the first flap 111, the first flap 111 can pivot toward a corresponding shelf 118 integrated in the substrate 110 and reach an equilibrium position wherein the first flap 111 engages the shelf 118. The fluid can communicate pressure to the second flap 111, causing the second flap 111 to pivot off the shelf 118 of the first flap 111 to the expanded setting and reach an equilibrium position based on fluid pressure in the fluid conduit 116 and tension across the tactile layer 120 between an edge of the first flap 111 and the attachment surface 112 of the substrate 110. The fluid pressure can cause the second flap 111 to hinge outward to an expanded setting offset above the first flap 111 and the peripheral region 124, yielding a tactilely distinguishable edge. This implementation can function to form a tactilely distinguishable button offset above the peripheral region 124 of the tactile layer 120 that can deform to a tactilely distinguishable button offset below the peripheral region 124.

Figure 15A:
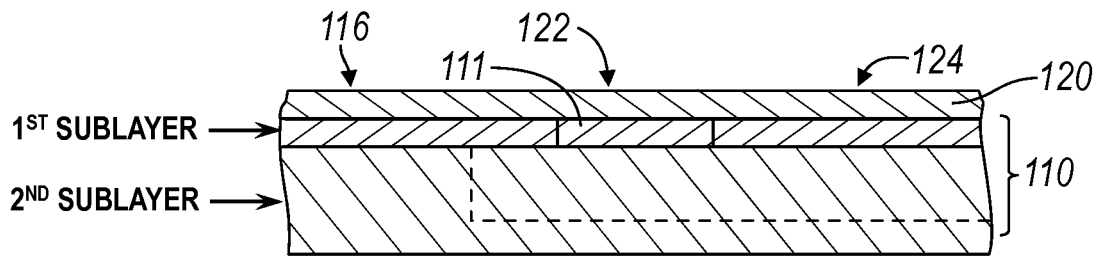
FIGS. 15A, 15B, and 15C are schematic representations of variations of the dynamic tactile interface.
Figure 15B:
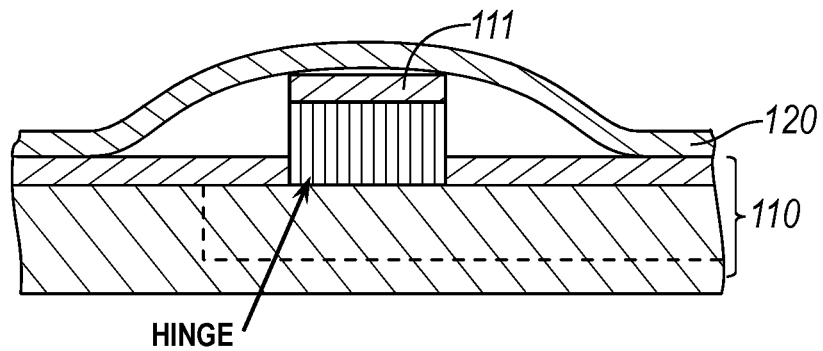
Figure 15C:
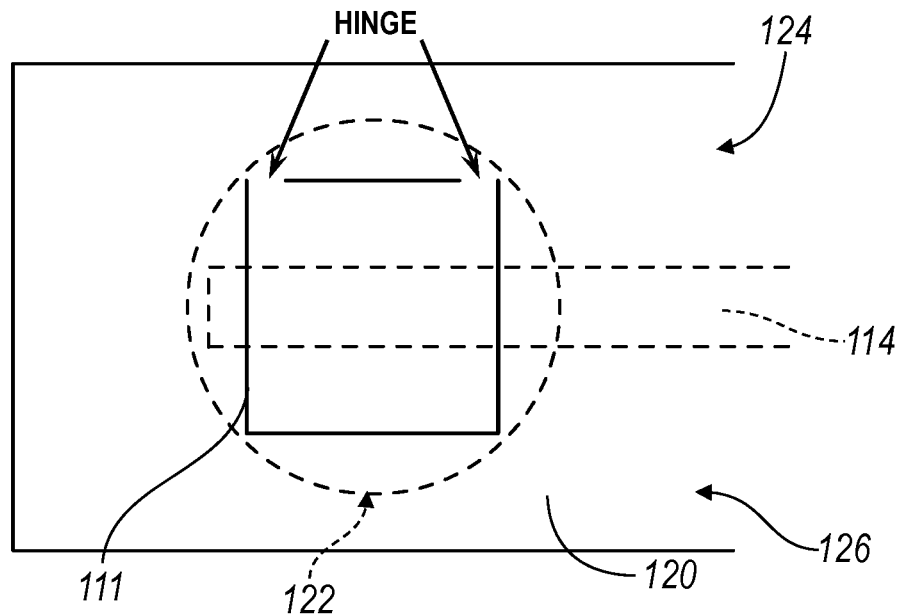

In another variation of the dynamic tactile interface, the substrate 110 includes sublayers, as shown in FIGS. 15A and 15B. The first (i.e., outer) sublayer can define the flap 111, and the second (i.e., inner) sublayer can define the fluid channel 114. For example, the flap 111 can be laser-cut into the first sublayer by tracing a perimeter of the flap 111 with a high-power laser beam and the fluid channel 114 can be formed in the second sublayer through conventional machining with an endmill. Features of the first and second sublayers can be formed or created in any other suitable way. The first sublayer and the second sublayer can then be bonded together to form the substrate 110 with the flap 111 in the first sublayer disconnected from the second sublayer. The second sublayer can, thus, define the shelf 118 described above and the flap 111 can rest on the shelf 118 in the retracted setting. When fluid pressure builds in the fluid channel 114, the flap 111 can lift off the shelf 118, the perimeter of the first sublayer around the shelf 118, thus, defining the fluid conduit 116. In this and other variations, the flap 111 can also be connected to the substrate 110 (e.g., the first sublayer of the substrate 110) by multiple hinges, such as by selectively cutting the perimeter of the flap 111 from the substrate 110, as shown in FIG. 15C.

In another variation of the dynamic tactile interface, deformable regions in a group of deformable regions can cooperate to form a substantially smooth area of the tactile surface 126 in the retracted setting and cooperate to form a textured area of the tactile surface 126 in the expanded setting. Generally, the deformable regions can be flush with the peripheral region 124($s$) in the retracted setting, forming a continuous, flush, and substantially smooth surface on which the deformable regions and the flaps can be tactilely indistinguishable. The displacement device 13o can expand the deformable regions and, thus, the flaps, forming tactilely distinguishable formations offset above the peripheral region 124. The deformable regions can be offset vertically above the peripheral region 124 in order to provide a tactilely distinguishable but non-obstructive formation to an input object contacting the tactile surface 126. The deformable regions can be arranged to form a pattern. For example, the deformable regions can be arranged to form a pattern of "dots" that form a perimeter around an area of the tactile layer 120 arranged over a virtual image of a key of a keyboard rendered by the display. Thus, the deformable regions can form the perimeter of the key. The deformable regions can be arranged in any pattern, such as a circle, cross, alphanumeric symbol, etc.

In another variation of the dynamic tactile interface, the deformable region 122 is connected to the flap 111 across an exterior surface of the flap 111 and the tactile layer 120 includes a boundary region between the deformable region 122 and the peripheral region 124, the boundary region substantially coincident a perimeter of the flap 111 and extensible in response to displacement of fluid into the fluid conduit 116. Generally, the boundary region functions to stretch in response to expansion of the deformable region 122 and the flap 111 to the expanded setting. The boundary region can be tensilely and extensibly flexible. Thus, when the flap 111 pivots to the expanded setting, the boundary region can stretch. The boundary region can further function to form an edge along the distal end of the flap 111 in the expanded setting by stretching from the distal edge to the peripheral region 124. The boundary region can be connected to (e.g., adhered or bonded to) the distal end of the flap 111 and the peripheral region 124, such that when the deformable region 122 and the flap 111 expand, the boundary region stretches taut. Likewise, in the retracted setting, the boundary region stretches taut. In a similar variation, the boundary region functions to stretch in response to retraction of the deformable region 122 and the flap 111 into the depressed retracted setting from the flush expanded setting. Thus, the boundary region enables the flap 111 to pivot and forms a tactilely distinguishable feature (e.g., an edge) outlining the profile of the flap 111.

In another variation of the dynamic tactile interface, the substrate 110 includes a second fluid conduit 116, a second shelf 118 adjacent the second fluid conduit 116 opposite the fluid conduit 116, and a second fluid channel 114 fluidly coupled to the second fluid conduit 116. The substrate 110 also includes a second flap 111 defining a second distal end and a second proximal end, the second flap 111 extending across the second fluid conduit 116 and hinged to the substrate 110 at the second proximal end adjacent the proximal end of the flap 111. The tactile layer 120 includes a second deformable region 122 adjacent the peripheral region 124 and arranged over the second flap 111; and wherein the displacement device 13o selectively displays fluid into the fluid channel 114 and the second fluid channel 114 to selectively transition the deformable region 122 and the second deformable region 122 from the retracted setting into the expanded setting, the second distal end of the second flap 111 engaging the second shelf 118 in the retracted setting, and the second distal end of the second flap 111 lifted off of the second shelf 118 and the second deformable region 122 defining a second formation tactilely distinguishable from the peripheral region 124 in the expanded setting.

In another variation of the dynamic tactile interface, the substrate 110 includes a group of fluid conduits; further defining a group of flaps, each flap 111 in the group of flaps arranged over a fluid conduit 116 in the group of fluid conduits. The tactile layer 120 includes an area defining a group of deformable regions, each deformable region 122 in the group of deformable region 122 arranged over a flap 111 in the group of flaps. The displacement device 130 displaces fluid into fluid channels in the group of fluid conduits to substantially simultaneously transition the deformable regions in the group of deformable regions from the retracted setting into the expanded setting, each deformable region 122 in the group of deformable regions substantially flush with the peripheral region 124 in the retracted setting, and each deformable region 122 in the group of deformable regions defining a formation tactilely distinguishable from the peripheral region 124 in the expanded setting.

6. Displacement Device

The displacement device 13o displaces fluid into the fluid channel 114 and through the fluid conduit 116 to transition the deformable region 122 from a retracted setting into an expanded setting, the distal end of the flap 111 engaging the shelf 118 in the retracted setting, and the distal end of the flap 111 lifted off of the shelf 118 and the deformable region 122 defining a formation tactilely distinguishable from the peripheral region 124 in the expanded setting. Alternatively, the displacement device 13o can displace fluid into the fluid channel 114 and through the fluid conduit 116 to transition the deformable region 122 from a retracted setting into an expanded setting, the distal end of the flap 111 engaging the shelf 118 in the flush expanded setting, and the distal end of the flap 111 below the shelf 118 and the deformable region 122 defining a formation tactilely distinguishable below the peripheral region 124 in the depressed retracted setting. Generally, the displacement device 13o functions to pump fluid into and/or out of the fluid channel 114 to transition the deformable region 122 between retracted and expanded settings and flush expanded and depressed retracted settings, as described in U.S. patent application Ser. No. 14/081,519. The dynamic tactile interface can also include multiple deformable regions and the displacement device 130 can interface with one or more valves and/or one or more actuators to selectively transition a subset of deformable region 122 between retracted and expanded settings. However, the displacement device 130 can be of any other suitable type and function in any other way to displace fluid into and out of the fluid channel 114 to transition one or more deformable regions between expanded and retracted settings.

7. Sensor

One variation of the dynamic tactile interface can include a sensor coupled to the substrate 110 and outputting a signal according to an input on the tactile surface 126. The sensor of the dynamic tactile interface can detect an input on the tactile surface 126. Generally, the sensor functions to sense a change in an electric field or electrical property across the tactile layer 120 and/or substrate 110 and to output a signal accordingly, such that a processor within the computing device can detect an input into the computing device based on the signal. Then the computing device can respond accordingly, such as described in U.S. patent application Ser. No. 13/896,098. The sensor can include a capacitive touch sensor interposed between the substrate 110 and a display coupled to the substrate 110, the capacitive touch sensor outputting a signal corresponding to an input on a tactile surface 126 of the tactile layer 120 proximal the deformable region 122. The sensor can additionally or alternatively output a signal corresponding to a change in fluid pressure within the fluid channel 114 in response to a force applied to the deformable region 122 of the tactile layer. Alternatively, the sensor can include a strain gauge integrated into the tactile layer 120 or arranged between the tactile layer 120 and the substrate 110 and configured to output a signal corresponding to deformation of the tactile layer. However, the sensor can function in any other way to detect an input on the tactile surface 126 at the deformable region 122 and/or at the peripheral region 124.

8. Display

One variation of the dynamic tactile interface includes a display coupled to the substrate 110 opposite the tactile layer 120 and rendering an image of a key adjacent the deformable region 122. Generally, the display can render an image of an input key proximal the deformable region 122, such as described above and in U.S. patent application Ser. No. 13/414,589. The dynamic tactile interface can also include a housing transiently engaging a mobile computing device, the housing transiently retaining the substrate 110 over a digital display of the mobile computing device. For example, the dynamic tactile interface can include an aftermarket housing that surrounds the mobile computing device and arranges the dynamic tactile interface substantially over the display of the mobile computing device.

9. Pedestal

One variation of the dynamic tactile interface, shown in FIGS. 17A, 17B, 18, and 19, includes a substrate 110 including an attachment surface 112, a cavity, and a fluid channel 114 fluidly coupled to the cavity, the cavity defining a curvilinear cross-section; a pedestal 113 arranged within the cavity, pivotable within the cavity, and including a mating surface and an exterior surface; a tactile layer 120 including a peripheral region 124 coupled to the attachment surface 112, a deformable region 122 adjacent the peripheral region 124 and arranged over the pedestal 113, and a tactile surface 126 opposite the substrate 110; a displacement device 130 displacing fluid into the fluid channel 114 and into the cavity to transition the deformable region 122 from a retracted setting into an expanded setting, the mating surface of the pedestal 113 in contact with the cavity and the pedestal 113 pivotable within the cavity between a first position and a second position in the retracted setting, the deformable region 122 flush with the peripheral region 124 in the first position and defining a first formation tactilely distinguishable from the peripheral region 124 in the second position, and the pedestal 113 partially elevated out of the cavity and the deformable region 122 defining a second formation tactilely distinguishable from the first formation and the peripheral region 124 in the expanded setting.

The foregoing variation of the dynamic tactile interface includes the substrate 110 including an attachment surface 112, a cavity, and a fluid channel 114 fluidly coupled to the cavity, the cavity defining a curvilinear cross-section. Generally, the substrate 110 and the pedestal 113 cooperate to support the tactile layer 120 against inward deformation into the cavity. The cavity forms a curvilinear cross-section recess in the substrate 110. In particular, the pedestal 113 and the substrate 110 cooperate to support the deformable against inward deformation into the cavity in the first position in the retracted setting. The pedestal 113 can also rotate, pivot, etc.

within the cavity to support the deformable region 122 in a tactilely distinguishable configuration offset above the peripheral region 124 of the tactile layer. For example, the pedestal 113 can provide an edge or sharp offset above the peripheral region 124.

The foregoing variation of the dynamic tactile interface includes a pedestal 113 arranged within the cavity, pivotable within the cavity, and including a mating surface and an exterior surface. Generally the pedestal 113 can function to support the tactile layer 120 and the deformable region 122 against deformation of the deformable region 122 into the cavity. The pedestal 113 can pivot, rotate, rise out of, or otherwise move within and relative to the cavity. The pedestal 113 can be of any shape and size suitable to support the deformable region 122 against substantial inward deformation beyond flush with the peripheral region 124 when in the first position. The pedestal 113 can be substantially transparent. The substrate 110 can define a ridge, edge, shoulder, shelf, etc. to retain the pedestal 113 within the cavity.

In one implementation, an exterior surface of the pedestal 113 is coupled to the deformable region 122. The pedestal 113 can be adhered, bonded, fastened, or otherwise coupled to the tactile layer 120 across the mating surface corresponding to the top surface of the pedestal 113, around the perimeter of the pedestal 113, or at select locations on the top surface of the pedestal 113. Alternatively, the pedestal 113 can be disconnected from the tactile layer.

Figure 17A:
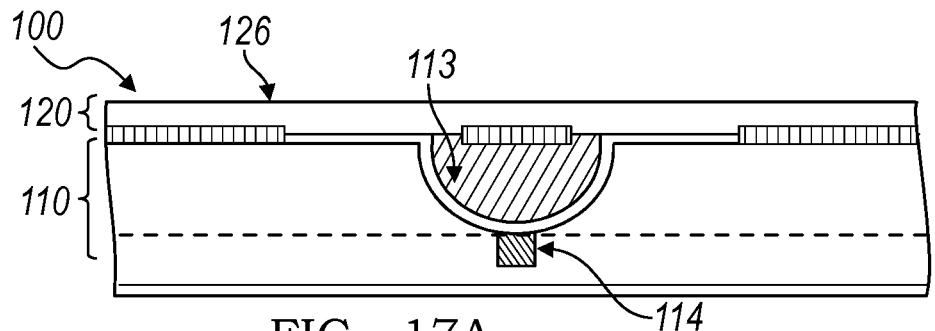
FIGS. 17A and 17B are schematic representation of variations of the dynamic tactile interface.
Figure 17B:
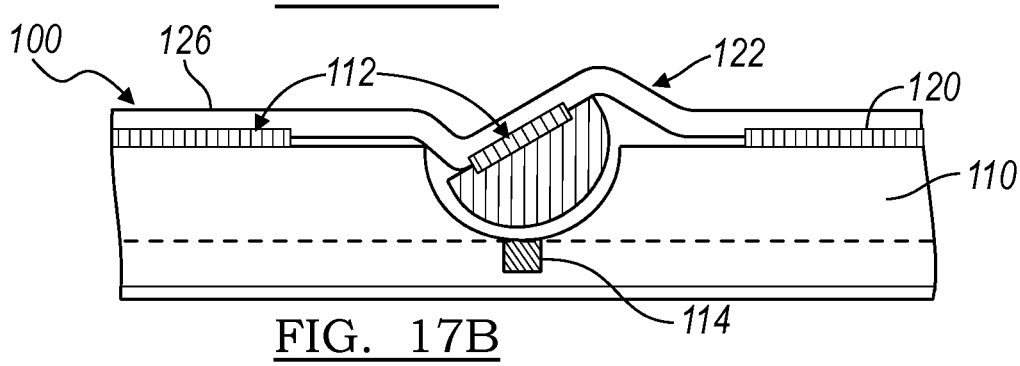

In one implementation in which the cavity is substantially hemispherical, the pedestal 113 can also be hemispherical, such that the pedestal 113 can rotate, rock, and/or otherwise move within the cavity. The pedestal 113 can, thus, function as a support member in the first position in which the mating surface of the pedestal 113 is substantially flush with the attachment surface 112 of the substrate 110 and as a gimble-type rocker when displaced out of the first position, as shown in FIG. 17B. When the pedestal 113 pivots within the cavity, a portion of the pedestal 113 pivots out of the cavity and, thus, elevated above the peripheral region 124. Thus, the pedestal 113 can support the tactile layer 120 above the peripheral region 124 in the second position. Likewise, when the pedestal 113 pivots within the cavity an opposing portion of the pedestal 113 can pivot into the cavity. If the tactile layer 120 is bonded to the mating surface of the pedestal 113, the pedestal 113 can pull the deformable region 122 of the tactile layer 120 into the cavity.

Alternatively, the pedestal 113 can be mated to the cavity that is semicircular, such that the rocker is constrained in all but one degree of rotational freedom. In this variation, the pedestal 113 can function as a rocker.

The shape of the pedestal 113 and the corresponding cavity can determine rotational response and motion of the pedestal 113. For example, a pedestal 113 with vertical walls can resist lateral motion and can limit pedestal 113 motion in substantially all but the vertical direction. In another example, the pedestal 113 can include curved or rounded walls, such as shown in FIG. 17A. The rounded walls of the pedestal 113 can be matched to the cavity and, thus, enable the pedestal 113 to exhibit not only linear up/down motion but also rotational motion, such as when pressed off-center, as shown in FIG. 17B. The pedestal 113 can, thus, enable tilt or joystick-type functionality. Moving a finger around the perimeter of the pedestal 113 can also result in circular motion around the axis of the pedestal 113. A change in height and position of the finger on the pedestal 113, such as relative an underlying touch sensor, can enable a sensor (e.g., a projected capacitance sensor) to detect motion of the pedestal 113, which can be correlated with a user input. In another example, the pedestal 113 can be cylindrical in shape and, thus, enable a twisting motion and/or vertical motion.

Figure 18:
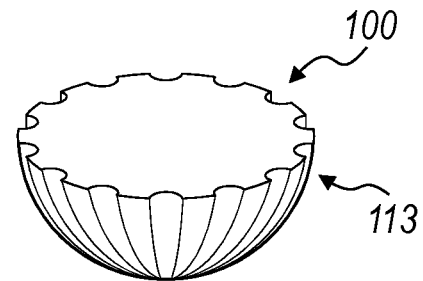
FIG. 18 is a schematic representation of a variation of the dynamic tactile interface.

As shown in FIG. 18, the pedestal 113 can also define one or more channels or grooves at an interface with a wall of cavity. Alternatively, the cavity can define one or more channels or grooves at an interface with a surface of the pedestal 113. As the displacement device 13o transitions the deformable region 122 from the expanded setting to the retracted setting, such as by drawing fluid out of the cavity by creating a vacuum, fluid may be trapped within the cavity, such as between the tactile layer 120 and the substrate 110, between the tactile layer 120 and a top surface of the pedestal 113 and/or between the pedestal 113 and the substrate 110. The channels and/or grooves in the pedestal 113 (and/or cavity) can enable fluid to drain from the cavity, thereby retracting the deformable region 122. The channels and/or grooves can be etched, molded, machined, stamped, or otherwise created on a surface of the pedestal 113 and/or cavity. Generally, these channels can fluidly couple an outer surface of the pedestal 113 to the fluid channel 114 coupled to the cavity in order to enable fluid to drain out of the cavity via the fluid channel 114.

Figure 19:
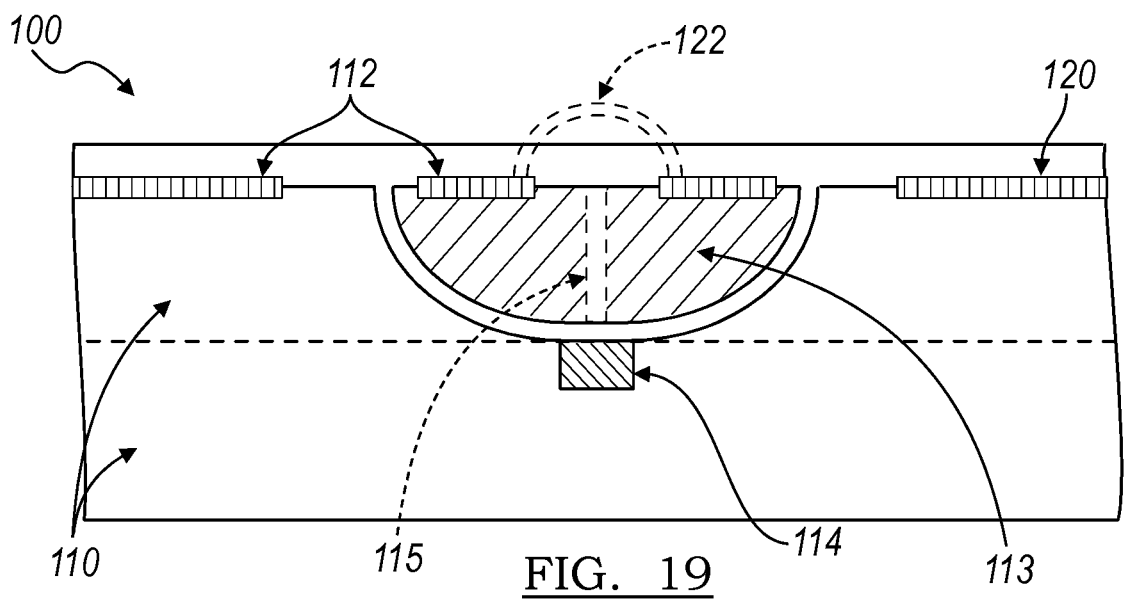
FIG. 19 is a schematic representation of a variation of the dynamic tactile interface.

As shown in FIG. 19, the pedestal 113 can further include one or more through-bores 115 and can be attached to a back surface of the tactile layer 120 (a surface of the tactile layer 120 that bonds to the substrate 11o) to define a secondary deformable region within the deformable region 122 of the tactile layer. The through-bore(s) 115 can communicate fluid through the pedestal 113 to the secondary deformable region, such that the user dynamic tactile interface can dynamically expand and retract the secondary deformable region to create a smaller tactilely distinguishable feature on top of the deformable region 122 in the expanded setting.

In one implementation of the variation, the pedestal 113 includes one or more through-holes. An area of the tactile layer 120 is disconnected from the pedestal 113 proximal the through-hole(s) at the outer surface of the pedestal 113. A portion of the tactile layer 120 encircling the area of the tactile layer disconnected from the pedestal 113 and the through-hole(s) is coupled (e.g., adhered, bonded) to the pedestal 113 and defines the perimeter of a tactilely distinguishable dimple or bump that provides tactile guidance to distinguish virtual keys of a virtual keyboard rendered on the display in the expanded setting. When the displacement device 130 displaces fluid into the cavity, thereby increasing fluid pressure within the cavity, the deformable region 122 expands, the pedestal 113 lifts away from the boundary of the cavity, and rises. The secondary deformable region, thus, expands above the deformable region 122, such as shown in FIG. 18. In this implementation, when fluid is withdrawn, from the fluid channel, the deformable region 122 retracts, the pedestal 113 recedes back into the cavity, and the secondary deformable region retracts to its initial position that is flush with the deformable region 122.

In another implementation of the foregoing variation, the pedestal 113 retains a first portion of the deformable region 122 and a second portion of the deformable region 122 substantially flush with the peripheral region 124 in the first position and the pedestal 113 retains the first portion of the deformable region 122 within the cavity and retains the second portion of the deformable region 122 above the peripheral region 124 in the second position. In this implementation, the pedestal 113 can be bonded to the tactile at the deformable region 122. Generally, this implementation of the foregoing variation functions to deform the deformable region 122 according to the profile of the pedestal 113 as it rotates within the cavity. Thus, the deformable region 122 can be coupled to the top surface of the pedestal 113 and the deformable region 122 can follow the position of the pedestal 113.

In a similar implementation of the foregoing variation, the pedestal 113 forms a crease across the second portion of the deformable region 122 in the second position. Generally, this implementation functions to create a tactilely distinguishable feature corresponding to an edge of the pedestal 113 corresponding to the second portion of the deformable region 122. Thus, the crease can define a tactilely distinguishable edge.

In another implementation of the foregoing variation, the exterior surface of the pedestal 113 is planar, and the exterior surface of the pedestal 113 retains the deformable region 122 in planar form vertically offset above the peripheral region 124 in the expanded setting.

In another implementation of the foregoing variation, the pedestal 113 defines a fluid conduit 116 extending from the mating surface to the exterior surface and communicating fluid between the cavity and the deformable region 122. A portion of the exterior surface of the pedestal 113 can be disconnected from the deformable region 122 around and offset from the fluid conduit 116.

In one implementation of the pedestal 113, the mating surface includes a corrugated profile defining a series of troughs, a trough in the series of troughs cooperating with the cavity to communicate fluid between the fluid channel 114 and the deformable region 122. Generally, this implementation of the pedestal 113 functions to communicate fluid from the fluid channel 114 about the periphery of the pedestal 113 in order to expand and retract the deformable region 122. The troughs allow fluid to drain from a deformable region 122 disconnected from the top surface of the pedestal 113 as the deformable region 122 retracts from the expanded setting vertically offset above the peripheral region 124 and above the top surface of the pedestal 113. In this implementation, the troughs can also communicate fluid from the fluid channel 114 to rotate the pedestal 113 within the cavity. Fluid pressure from fluid communicated through the trough to the deformable region 122 can cause the deformable region 122 connected to the top surface of the pedestal 113 to lift. The pedestal 113 can, accordingly, lift out of the cavity. The troughs can be arranged around the pedestal 113 such that a portion of the pedestal 113 communicates more or less fluid to the deformable region 122. For example, a hemispherical pedestal 113 can have a first portion of the pedestal 113 with several large troughs and a second portion of the pedestal 113 with one small trough. More fluid communicates through the trough toward the deformable region 122 corresponding to the first portion than toward the deformable region 122 corresponding to the second portion. Thus, greater fluid pressure is applied to the deformable region 122 corresponding to the first portion causing the first portion of the deformable region 122 to lift above the peripheral region 124. The pedestal 113 can, thus, rotate to support the deformable region 122, such that an edge of the pedestal 113 corresponding to the first portion rotates to a position offset above the peripheral region 124 and an edge of the pedestal 113 corresponding to the second portion rotates into the cavity.

In another implementation, the pedestal 113 defines a groove along the mating surface and the substrate 110 defines a rib along the cavity, the rib engaging the groove and constraining the pedestal 113 in one degree of freedom in the retracted setting. In this implementation, the pedestal 113 can define a hemicircular or hemispherical pedestal 113 with a groove that mates to a rib in the substrate 110. The hemispherical pedestal 113, for example, can define the groove, such that groove prevents the hemispherical pedestal 113 from rotating within the cavity about a vertical axis of the cavity. Thus, the groove can restrict rotation of the hemispherical pedestal 113 to pitching and/or yawing. The rib can define an extruded ledge, shelf, shoulder, or any other formation suitable to mate with the groove in the pedestal 113. Likewise, the pedestal 113 can define the rib and the substrate 110 can define the groove, the groove mating with the rib to restrict rotation of the pedestal 113 in substantially the same way.

In an example of the foregoing implementation, the groove defines an internal dentated profile and the rib defines an external dentated profile that engages the groove to retain the pedestal 113 in a series of arcuate positions within the cavity, the series of arcuate positions comprising the first position and the second position. Generally, this implementation functions to define predetermined positions of the pedestal 113 and, thus, predetermined offsets of an edge of the pedestal 113 defining a height of the deformable region 122 above the peripheral region 124. The groove can fix the pedestal 113 in a location, such that when a user depresses the deformable region 122 and, thus, the pedestal 113, the pedestal 113 resists the depressions and maintains the form of the deformable region 122. Likewise, the groove can function to maintain the deformable region 122 and the pedestal 113 retracted setting to prevent optical and tactile aberrations in the tactile layer.

In another implementation of the foregoing variation, the cavity defines a hemispherical recess, the pedestal 113 defines a hemispherical boss pivotable in three degrees of freedom within the cavity in the retracted setting, and the exterior surface of the pedestal 113 defines a circular perimeter offset from an edge of the cavity. Likewise, the cavity can define a hemicircular recess, and the pedestal 113 can define a hemicircular boss pivotable in one degree of freedom within the cavity in the retracted setting.

The foregoing variation of the dynamic tactile interface can include a displacement device 130 displacing fluid into the fluid channel 114 and into the cavity to transition the deformable region 122 from a retracted setting into an expanded setting, the mating surface of the pedestal 113 in contact with the cavity and the pedestal 113 pivotable within the cavity between a first position and a second position in the retracted setting, the deformable region 122 flush with the peripheral region 124 in the first position and defining a first formation tactilely distinguishable from the peripheral region 124 in the second position, and the pedestal 113 partially elevated out of the cavity and the deformable region 122 defining a second formation tactilely distinguishable from the first formation and the peripheral region 124 in the expanded setting.

The foregoing variation of the dynamic tactile interface can include a sensor coupled to the substrate 110 and outputting a signal corresponding to an input on the tactile surface 126. Another implementation of the foregoing variation can include a second sensor outputting a signal corresponding to a degree of arcuate rotation of the pedestal 113 from the first position in the retracted setting. The second sensor can detect the rotation of the pedestal 113 to determine the position (e.g., offset) of the deformable relative the peripheral region 124. The signal can relay information to determine fluid pressure adjacent the pedestal 113, the deformable region 122, in the fluid channel 114, etc. The sensor can also be integrated within the pedestal or integrated in the substrate adjacent the mating surface of the pedestal and, thus, can detect motion or position of the pedestal. The sensor can include a Hall effect sensor or a magnetic sensor, gyroscope, resistive sensor, or any other sensor suitable to detect motion and/or position of the pedestal.

In another implementation of the foregoing variation, a display can be coupled to the substrate 110 opposite the tactile layer 120 and render an image of a key adjacent the deformable region 122, and the substrate 110, the pedestal 113, and the tactile layer 120 comprises substantially transparent materials.

In another implementation of the foregoing variation, a display can be coupled to the substrate 110 opposite the tactile layer 120 and render an image of a key adjacent the deformable region 122, and a sensor can be interposed between the substrate 110 and the display, the sensor and outputting a signal corresponding to an input on the tactile surface 126, the substrate 110, the pedestal 113, and the tactile layer 120 comprises substantially transparent materials.

Another implementation of the foregoing variation includes a first magnetic element arranged within the substrate 110 adjacent a base of the cavity and a second magnetic element arranged within the pedestal 113 and cooperating with the first magnet to retain the pedestal 113 in the first position in the retracted setting. Generally, the magnetic element can function to retain the pedestal 113 in the first position or any other position in order to substantially resist pitching or yawing of the pedestal 113 and, thus, deformation of the deformable region 122. When the force applied to the pedestal 113 exceeds an attractive force between the first and second magnetic elements, the pedestal 113 can pitch within the cavity and deform the adjacent deformable region 122 as described above. The first magnetic element can be integrated into or coupled to the substrate 110. The second magnetic element can be integrated into, adhered to, or otherwise coupled to the pedestal 113.

Another implementation of the third method includes a housing transiently engaging a mobile computing device, the housing transiently retaining the substrate 110 over a digital display of the mobile computing device.

In another implementation, the substrate defines a shoulder that substantially retains the pedestal and prevents the pedestal from rising out of the cavity above flush with the peripheral region. The substrate also can define a second cavity below the cavity, the second cavity defining a substantially hemicircular cross-section. Thus, when the pedestal pivots within the cavity, a portion of the pedestal can rotate into the second cavity.

In another implementation, the substrate can define a vertical shoulder or thin vertical edge, which, in the retracted state, retains the pedestal within the cavity and resists rotation of the pedestal above flush with the peripheral region by engaging the mating surface or any other surface of the pedestal. However, the displacement device can pump fluid into the cavity, causing the attachment surface of the pedestal to rise to an elevated position above the vertical shoulder. In the elevated position, the pedestal can pivot freely within the cavity.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A dynamic tactile interface comprising:
 a substrate comprising an attachment surface, a cavity, and a fluid channel fluidly coupled to the cavity, the cavity defining a curvilinear cross-section;
 a pedestal arranged within the cavity, pivotable within the cavity, and comprising a mating surface and an exterior surface;
 a tactile layer comprising a peripheral region coupled to the attachment surface, a deformable region adjacent the peripheral region and arranged over the pedestal, and a tactile surface opposite the substrate;
 a displacement device displacing fluid into the fluid channel and into the cavity to transition the deformable region from a retracted setting into an expanded setting, the mating surface of the pedestal in contact with the cavity and the pedestal pivotable within the cavity between a first position and a second position in the retracted setting, the deformable region flush with the peripheral region in the first position and defining a first formation tactilely distinguishable from the peripheral region in the second position, and the pedestal partially elevated out of the cavity and the deformable region defining a second formation tactilely distinguishable from the first formation and the peripheral region in the expanded setting; and
 a sensor coupled to the substrate and outputting a signal corresponding to an input on the tactile surface.

2. The dynamic tactile interface of claim 1, wherein the mating surface comprises a corrugated profile defining a series of troughs, a trough in the series of troughs cooperating with the cavity to communicate fluid between the fluid channel and the deformable region.

3. The dynamic tactile interface of claim 1, wherein the pedestal defines a groove along the mating surface; wherein the substrate defines a rib along the cavity, the rib engaging the groove and constraining the pedestal in one degree of freedom in the retracted setting.

4. The dynamic tactile interface of claim 3, wherein the groove defines an internal dentated profile; and wherein the rib defines an external dentated profile that engages the groove to retain the pedestal in a series of arcuate positions within the cavity, the series of arcuate positions comprising the first position and the second position.

5. The dynamic tactile interface of claim 1, wherein the deformable region is coupled to the exterior surface of the pedestal.

6. The dynamic tactile interface of claim 5, wherein the pedestal retains a first portion of the deformable region and a second portion of the deformable region substantially flush with the peripheral region in the first second position; and wherein the pedestal retains the first portion of the deformable region within the cavity and retains the second portion of the deformable region above the peripheral region in the second position.

7. The dynamic tactile interface of claim 6, wherein the pedestal forms a crease across the second portion of the deformable region in the second position.

8. The dynamic tactile interface of claim 5, wherein the exterior surface of the pedestal is planar; and wherein the exterior surface of the pedestal retains the deformable region in planar form vertically offset above the peripheral region in the expanded setting.

9. The dynamic tactile interface of claim 5, wherein the pedestal defines a fluid conduit extending from the mating surface to the exterior surface and communicating fluid between the cavity and the deformable region; and wherein a portion of the exterior surface of the pedestal around and offset from the fluid conduit is disconnected from the deformable region.

10. The dynamic tactile interface of claim 1, wherein the cavity defines a hemispherical recess; wherein the pedestal defines a hemispherical boss pivotable in three degrees of freedom within the cavity in the retracted setting; and wherein the exterior surface of the pedestal defines a circular perimeter offset from an edge of the cavity.

11. The dynamic tactile interface of claim 1, wherein the cavity defines a hemicircular recess; and wherein the pedestal defines a hemicircular boss pivotable in one degree of freedom within the cavity in the retracted setting.

12. The dynamic tactile interface of claim 1, further comprising a display coupled to the substrate opposite the tactile layer and rendering an image of a key adjacent the deformable region; wherein the substrate, the pedestal, and the tactile layer comprises substantially transparent materials.

13. The dynamic tactile interface of claim 1, further comprising a second sensor outputting a signal corresponding to a degree of arcuate rotation of the pedestal from the first position in the retracted setting.

14. The dynamic tactile interface of claim 1, wherein the pedestal and the substrate cooperate to support the deformable against inward deformation into the cavity in the first position in the retracted setting.

15. A dynamic tactile interface comprising:
a substrate comprising an attachment surface, a cavity, and a fluid channel fluidly coupled to the cavity, the cavity defining a curvilinear cross-section;
a pedestal arranged within the cavity, pivotable within the cavity, and comprising a mating surface and an exterior surface;
a tactile layer comprising a peripheral region coupled to the attachment surface, a deformable region adjacent the peripheral region and arranged over the pedestal, and a tactile surface opposite the substrate; and
a displacement device displacing fluid into the fluid channel and into the cavity to transition the deformable region from a retracted setting into an expanded setting, the mating surface of the pedestal in contact with the cavity and the pedestal pivotable within the cavity between a first position and a second position in the retracted setting, the deformable region flush with the peripheral region in the first position and defining a first formation tactilely distinguishable from the peripheral region in the second position, and the deformable region defining a second formation tactilely distinguishable from the first formation and the peripheral region in the expanded setting.

16. The dynamic tactile interface of claim 15, further comprising a display coupled to the substrate opposite the tactile layer and rendering an image of a key adjacent the deformable region, and further comprising a sensor interposed between the substrate and the display, the sensor and outputting a signal corresponding to an input on the tactile surface; and wherein the substrate, the pedestal, and the tactile layer comprises substantially transparent materials.

17. The dynamic tactile interface of claim 15, further comprising a first magnetic element arranged within the substrate adjacent a base of the cavity; and further comprising a second magnetic element arranged within the pedestal and cooperating with the first magnet to retain the pedestal in the first position in the retracted setting.

18. The dynamic tactile interface of claim 15, further comprising a housing transiently engaging a mobile computing device, the housing transiently retaining the substrate over a digital display of the mobile computing device.

19. The dynamic tactile interface of claim 15, wherein the pedestal retains a first portion of the deformable region and a second portion of the deformable region substantially flush with the peripheral region in the first second position; and wherein the pedestal retains the first portion of the deformable region within the cavity and retains the second portion of the deformable region above the peripheral region in the second position.

20. The dynamic tactile interface of claim 19, wherein the cavity defines a hemispherical recess; wherein the pedestal defines a hemispherical boss pivotable in three degrees of freedom within the cavity in the retracted setting; and wherein the exterior surface of the pedestal defines a circular perimeter that forms a hemispherical crease across the second portion of the deformable region in the second position.

* * * * *